United States Patent
Heyna

(10) Patent No.: US 12,024,264 B2
(45) Date of Patent: Jul. 2, 2024

(54) BICYCLE DERAILLEUR PULLEY

(71) Applicant: SRAM DEUTSCHLAND GmbH, Schweinfurt (DE)

(72) Inventor: Sebastian Heyna, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 124 days.

(21) Appl. No.: 17/700,633

(22) Filed: Mar. 22, 2022

(65) Prior Publication Data

US 2022/0306241 A1    Sep. 29, 2022

(30) Foreign Application Priority Data

Mar. 26, 2021  (DE) ...................... 10 2021 001 592.4
Feb. 11, 2022  (DE) ...................... 10 2022 103 284.1

(51) Int. Cl.
*B62M 9/126*     (2010.01)
*B62M 9/16*      (2006.01)

(52) U.S. Cl.
CPC .............. *B62M 9/126* (2013.01); *B62M 9/16* (2013.01)

(58) Field of Classification Search
CPC ................................ B62M 9/126; B62M 9/16
USPC ......................................................... 474/82
See application file for complete search history.

(56) References Cited

FOREIGN PATENT DOCUMENTS

| CN | 112478041 A | * | 3/2021 | |
| DE | 2521642 A1 | | 1/1976 | |
| DE | 102012013645 A1 | * | 1/2014 | ............ B62M 9/126 |
| DE | 102015016767 A1 | * | 6/2017 | .............. B62M 9/10 |
| DE | 102015016767 A1 | | 6/2017 | |
| EP | 2641823 A2 | * | 9/2013 | .............. B62M 1/36 |
| EP | 3388324 A3 | | 12/2018 | |
| JP | 2904823 B2 | * | 6/1999 | |
| WO | 2641823 B1 | | 8/2016 | |

* cited by examiner

*Primary Examiner* — Gene O Crawford
*Assistant Examiner* — Emily R Kincaid

(57) ABSTRACT

A bicycle derailleur pulley comprises a bearing region rotatable about an axis of rotation, a tooth region with teeth formed thereon for engaging into the chain, and a supporting structure that connects the bearing region and the tooth region. On at least one tooth of the chain-guiding pulley, on each of the inboard-side and outboard-side side surfaces thereof, there are formed guide regions for lateral guidance of the chain substantially parallel to the axis of rotation. At least one inboard-side guide region of the at least one tooth has an at least regionally reduced thickness dimension, relative to a central plane of the chain-guiding pulley, in relation to at least one outboard-side guide region, such that a chain section running substantially tangentially off the chain-guiding pulley can assume a greater skew angle in an outboard direction than in an inboard direction.

24 Claims, 11 Drawing Sheets

(Detail A)

(Detail A)

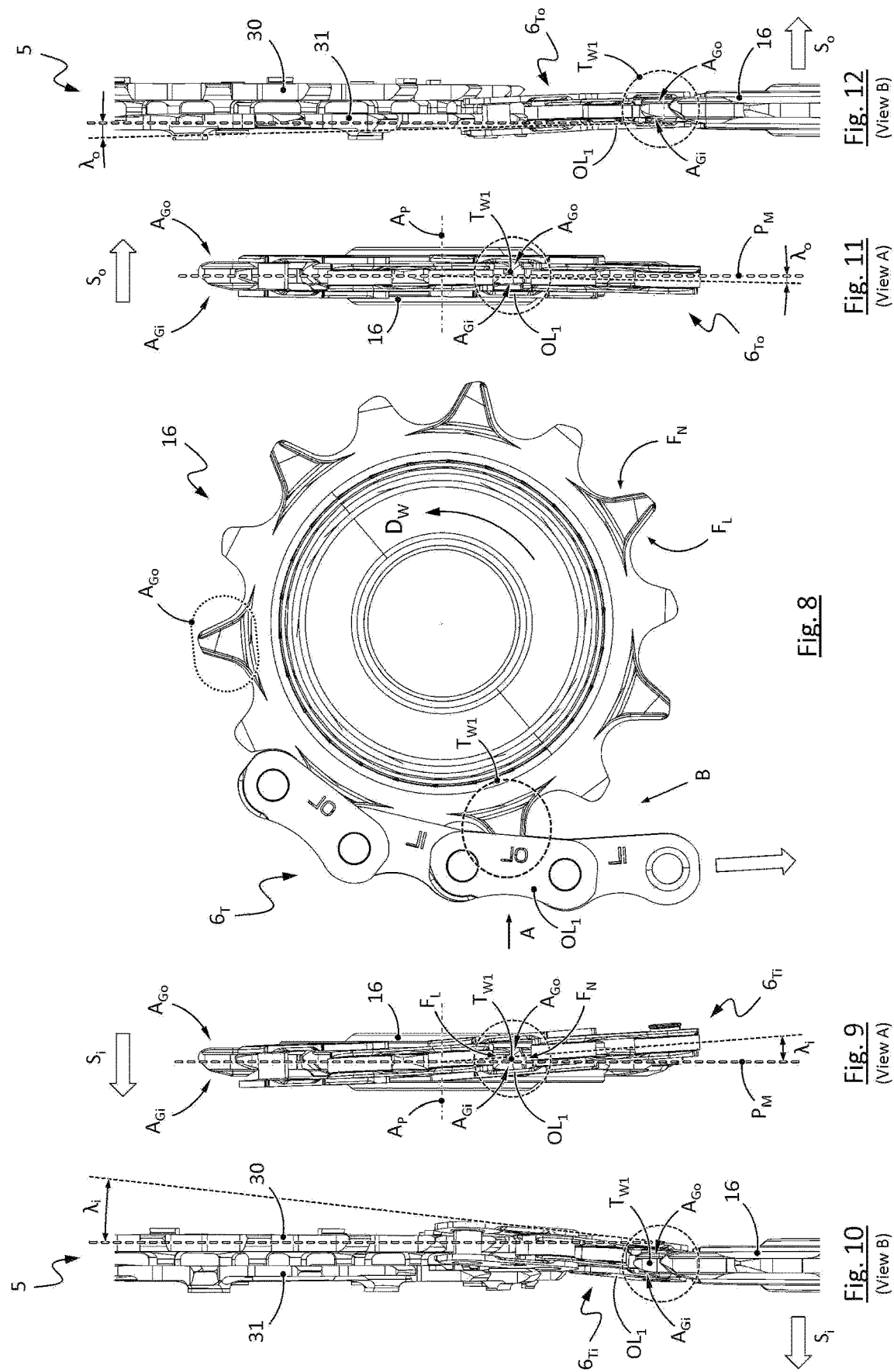

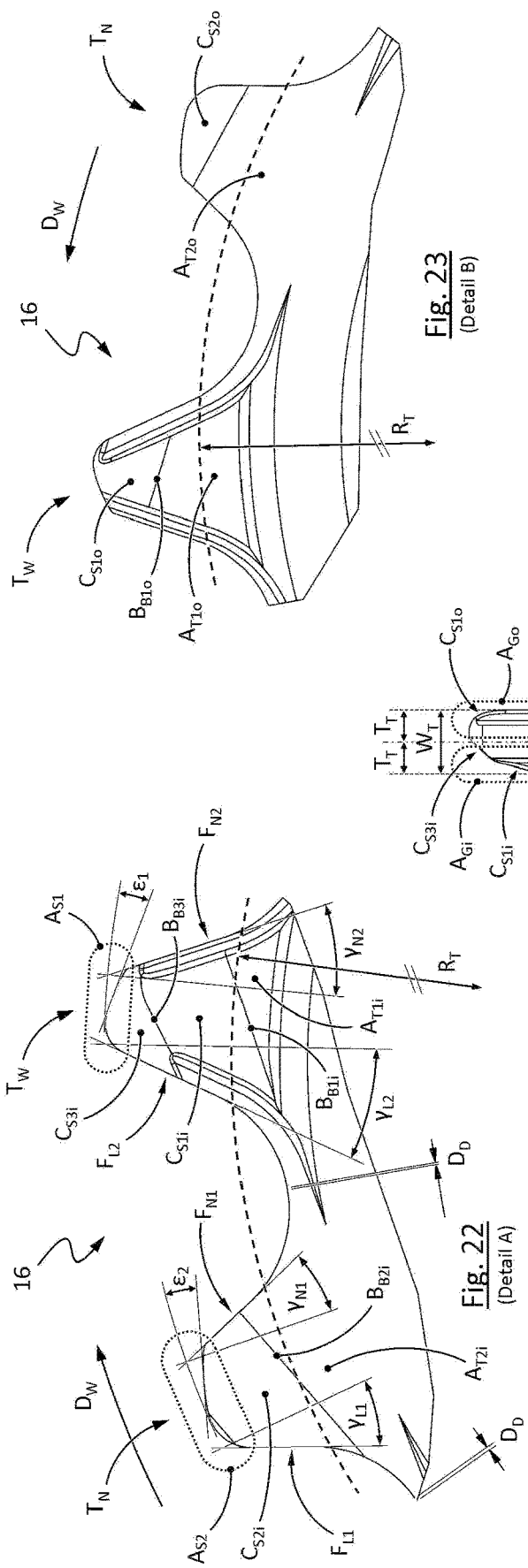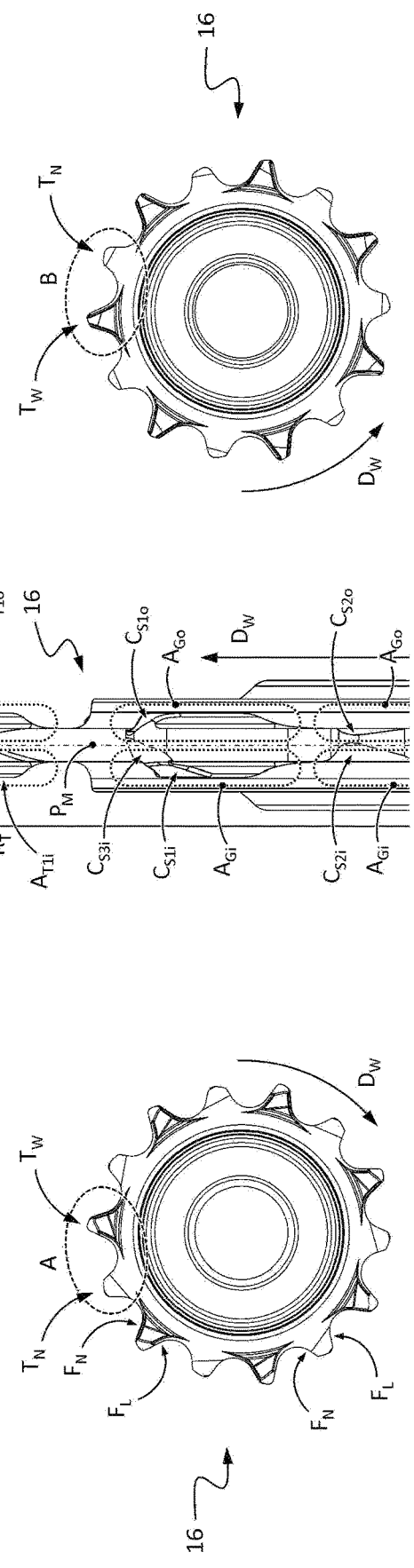

BICYCLE DERAILLEUR PULLEY

PRIORITY

This application claims priority to, and/or benefit of, German patent application DE 10 2021 001 592.4, filed on Mar. 26, 2021, and German patent application DE 10 2022 103 284.1 filed on Feb. 11, 2022, the contents of which are included by reference herein in their entirety.

BACKGROUND

Bicycle sprocket cassettes comprise a plurality of sprockets which are spaced apart axially with respect to the rear axle, and which have numbers of teeth that differ in a stepped manner. Depending on the transmission or gear ratio selected by the rider, the bicycle chain is placed by a derailleur onto one of the sprockets and thus, in interaction with the number of teeth of a chainring on the bottom bracket, determines the transmission ratio and the cadence desired by the rider.

In recent years, in the bicycle industry, especially in the mountain bike sector, there has been a trend towards reducing the number of bottom bracket chainrings from the traditional three differently sized chainrings firstly to two and more recently to mostly only one single chainring, at least in the higher-end market segment. This simplifies the drivetrain and increases the reliability thereof. Also, in this way, for the rider, the gearshift actuation and gearshift logic is simplified as it is reduced to just one gearshift lever.

Furthermore, the front derailleur in the region of the pedal-crank bearing or bottom bracket is thus also omitted, as are the control thereof and the means required for the fastening thereof on the bicycle frame and bicycle handlebar. The omission of the derailleur, additional chainrings and gearshift lever and accessories are also associated with a significant reduction in weight of the bicycle.

In the case of bicycles with electric auxiliary drive, too, the use of multiple shift-capable chainrings is omitted in most cases, inter alia for structural space reasons and for the purposes of simplifying the drivetrain.

With the omission of that partial factor of the transmission ratio range on the bicycle that was previously provided by way of multiple chainrings at the bottom bracket, and which was typically in the range from 180 to 200%, it has become necessary to greatly increase the transmission ratio range provided by the sprocket cassette.

This need has led to the development of sprocket cassettes that have both very small sprockets, down to as little as 11 teeth or fewer, on the outboard side, and very large sprockets, up to as many as 50 teeth or more, on the inboard side. These cassettes thus reach transmission ratio ranges in the region of 500%, and therefore provide a suitable transmission ratio in virtually all riding situations.

Among other things, in order to keep operating forces low during gearshifts between the various transmission ratio stages of the cassette, rear derailleurs with a non-inclined or only slightly inclined gearshift parallelogram are primarily used in combination with such cassettes. Such derailleurs are known for example from the documents EP2641823B1 or EP3388324A3, and are also referred to in the industry as so-called straight-pin derailleurs. In the context of the present disclosure and of the above-cited prior art documents, the expression "non-inclined or slightly inclined gearshift parallelogram" means that the axes of the gearshift parallelogram are arranged so as to be parallel, or only slightly inclined, relative to a longitudinal central plane of the bicycle when the derailleur is operatively mounted on the bicycle. In particular, in the case of a "non-inclined or only slightly inclined gearshift parallelogram", the vertical tracking of the chain-guiding pulley of the derailleur along the tooth tip contour of the sprocket cassette during gearshifts occurs predominantly by way of the pivoting movement of the chain cage and thus by way of the pivoting movement of the upper chain-guiding pulley, and not predominantly by way of the inclination of the parallelogram, as is the case with derailleurs with an oblique parallelogram.

In the case of such derailleurs, the gearshift parallelogram of the derailleur thus moves in a plane that has no inclination component or only a slight inclination component about an imaginary straight line running in a direction of travel. Such derailleurs thus differ considerably from the design, which has hitherto been used for decades, with a steeply inclined gearshift parallelogram, which approximately follows the contour of the sprocket cassette during gearshift operations by way of its inclination.

In the case of such derailleurs with a non-inclined or only slightly inclined gearshift parallelogram, the upper chain-guiding pulley is installed with a considerable spacing to the P axis (pivot axis of the chain cage relative to the movable gearshift element or P-knuckle), cf. for example FIG. 3 of EP3388324A3 or FIGS. 3 to 7 of EP2641823B1.

In the case of bicycle derailleurs, the upper and lower chain-guiding pulley are commonly received between two guide plates of a derailleur cage arrangement, also referred to for simplicity and synonymously in the industry and in the following description as chain cage assembly or chain cage.

Here, the derailleur pulleys serve both for guiding the chain in the region of the sprocket cassette at the rear wheel of the bicycle and for maintaining the chain tension and for absorbing the excess chain length in accordance with the engaged gear ratio.

The chain cage is usually spring-loaded to pivot about a pivot axis relative to the so-called P-knuckle of the derailleur, and thus ensures that the required chain tension is maintained.

Here, the lower chain pulley, often also referred to as chain-tensioning pulley, performs the task of receiving the excess chain length, and the task of guiding the return strand of the chain into the derailleur as reliably as possible under all operating conditions.

The upper chain pulley, commonly also referred to as chain-guiding pulley, performs the task of in particular laterally guiding the return strand of the chain that runs onto the sprocket cassette, and of performing the gearshifts between the various sprockets of the sprocket cassette when these are initiated by the rider by way of a gearshift lever or a corresponding actuating element.

The large transmission ratio range or the large gear ratio spread of the sprocket cassettes described in the introduction has the result, owing to the number of gear ratios (generally 10 to 13) limited inter alia by the axially restricted structural space, and owing to the associated selection of percentage gear ratio steps between adjacent sprockets, that, in the case of such cassettes, there are in some cases larger gear ratio steps than are customary in the case of multiple drives, that is to say in the case of drivetrains with more than one sprocket in the pedal-crank bearing region and therefore normally with a relatively small transmission ratio range of the cassette.

The combination of the large gear ratio steps and of the considerable spacing (which is customary in the case of derailleurs with non-inclined or slightly inclined oblique parallelogram) between the P axis and the chain-guiding pulley gives rise to the geometrical boundary condition that what is known in the industry as the chain gap, that is to say the spacing between the upper chain-guiding pulley and that sprocket of the sprocket cassette which is in engagement with the chain, during an inboard gearshift operation is significantly smaller than the chain gap during an outboard gearshift operation and than the chain gap during the normal operational running of the chain.

This is because, in the case of most bicycle derailleurs, and in particular in the case of the abovementioned derailleurs with non-inclined or only slightly inclined gearshift parallelogram, during an inboard gearshift operation, the chain cage is first pivoted, and thus the follow-up movement of the upper chain-guiding pulley along the cone-like tooth tip contour of the sprocket cassette first begins, when the chain has already engaged into the larger sprocket. In the case of such derailleurs, the complete pivoting of the chain cage and thus the desired follow-up movement of the upper chain-guiding pulley and the establishing of the desired chain gap between the upper chain-guiding pulley and the larger target sprocket of the gearshift operation is even ended only when the chain has departed from the smaller sprocket and is running entirely on the larger sprocket.

In the case of the abovementioned derailleurs with non-inclined or only slightly inclined gearshift parallelogram, during the inboard gearshift operation, the chain gap, i.e., the spacing between the upper chain-guiding pulley and the larger target sprocket, is thus first increased by the pivoting of the chain cage. Since, in the case of such derailleurs, the chain cage including the upper chain-guiding pulley is however displaced substantially horizontally in an inboard direction already before the pivoting of the chain cage, and thus before the desired adaptation of the chain gap, it is the case in such derailleurs that the upper chain-guiding pulley pushes the chain towards the larger sprocket with only a small radial spacing, that is to say chain gap, at the start of the inboard gearshift operation.

In particular, during current bicycle gearshift operations, referred to uniformly as indicated bicycle gearshift operations, in which the movement travel of the chain cage and thus of the upper chain-guiding pulley in an axial direction of the sprocket cassette takes place in a stepped manner in accordance with the spacings of the sprockets of the sprocket cassette, said axial movement travel is always substantially constant for each shifted gear ratio and thus always substantially corresponds to an absolute dimension that is consistent with the sprocket spacings.

As described above, the chain gap, and thus the free chain section traversing between the chain-guiding pulley and the larger sprocket is relatively short during inboard gearshift operations, whereby, on the basis of trigonometric relationships, the constant absolute dimension of the axial deflection of the derailleur in an inboard direction results in a desired relatively large skew angle of the traversing chain section in order to transfer the chain correctly onto the larger sprocket and in order to avoid incorrect gearshift operations.

In fact, in the case of upper chain-guiding pulleys known from the prior art, the chain-guiding characteristic and thus the skew angle is however equal on both axial sides of the chain-guiding pulley, whereby the skew angle during inboard gearshift operations with chain-guiding pulleys according to the prior art is relatively small.

Therefore, in the case of these known chain-guiding pulleys, under the above-described assumption of the constant absolute dimension of the axial derailleur deflection for each shifted gear ratio, and in the presence of the relatively small chain skew angle in the case of these pulleys even during inboard gearshift operations, premature shifting to the larger sprocket generally occurs because, during the gearshift operation, the chain rubs against the teeth of the larger sprocket earlier or with greater intensity, and thus tends to ride up onto the larger sprocket prematurely.

On the sprockets of multi-sprocket cassettes, there are commonly provided specially designed so-called gearshift channels with recesses and with special riding-up teeth, at which the chain is intended to ride up from the smaller onto the larger sprocket along an exactly defined path, which runs in particular approximately tangentially between the two sprockets. In order to prevent gearshift errors, the chain must thus however be slidingly deflected laterally along all other teeth of the larger sprocket until the chain reaches one of the riding-up teeth of the larger sprocket.

During inboard gearshift operations, however, the deflection of the chain on teeth of the larger sprocket that are not provided for upshifting becomes more difficult the larger the gear ratio step is between the sprockets, the smaller the chain gap is and thus the shorter the length of the traversing chain section is at the start of the gearshift operation, and the more teeth are situated between the riding-up teeth of the larger sprocket, which are distributed along the circumference of the larger sprocket.

A particular challenge with regard to the deflection of the chain arises if, in particular in the case of sprocket cassettes with thick-thin teeth, also known in the industrial industry as X-Sync sprockets, the chain is situated on an odd-numbered so-called transition sprocket and must be shifted from there in a synchronized manner in a defined orientation onto the next larger, even-numbered sprocket which has thick-thin teeth, such that the thin teeth of the larger sprocket engage into inner link plate chain links and the thick teeth of the larger sprocket engage into outer link plate chain links. Such a gearshift situation is known for example from paragraph [0085] in conjunction with FIG. 5 of DE102015016767A1.

In such a situation, proceeding from the odd-numbered transition sprocket, and in a manner dependent on the sprocket size, during each revolution of the sprocket cassette, there are under some circumstances only two or in some cases even only one available suitable rotational angle position of the cassette at which a riding-up tooth coincides with an outer link plate of the chain. This is because it is desired for the chain to ride up onto an even-numbered thick-thin sprocket only at an outer link plate link in order that the chain does not ride up onto the larger sprocket in a desynchronized manner, that is to say with the chain inner link plates riding up onto the thick teeth.

Even if, in such a situation, the larger sprocket comprises a multiplicity of inboard gear-shift channels with respectively associated riding-up tooth, which owing to the alternating thick and thin teeth have in principle a spacing to one another of an even number of teeth, the chain, proceeding from an odd-numbered transition sprocket, can in the best case ride up onto the even-numbered larger sprocket only at every second riding-up tooth, because it is only at every second riding-up tooth that the chain running on the odd-numbered transition sprocket arrives with an outer link plate link at the riding-up tooth.

In such and similar situations, the chain must therefore be deflected on a particularly large number of teeth of the larger sprocket, under some circumstances even over approximately one entire rotation of the sprocket cassette, so as not to ride up onto the larger sprocket at an undesired position, which can lead to rough gearshift operations, increased load on the drivetrain and undesired generation of noise, to the point of slipping of the chain on the sprocket cassette and thus an impairment of riding safety.

What is accordingly desirable overall, in particular in the case of the derailleurs described in the introduction with non-inclined or only slightly inclined gearshift parallelogram, and even more so in the case of the combination of such derailleurs with sprocket cassettes with thick-thin teeth, is increased skew of the chain during inboard gearshift operations, and for this purpose therefore a relatively weak axial chain-guiding characteristic of the chain cage or of the upper chain-guiding pulley, in order that the chain does not ride up onto the next larger sprocket at a tooth that is not provided for this, but is instead deflected as effectively as possible on all teeth that are not intended for the riding-up operation.

In the case of outboard gearshift operations in such derailleurs, in inverse analogy to the above explanations with regard to the inboard gearshift operation, there is a considerably larger chain gap, that is to say spacing between the upper chain-guiding pulley and the larger sprocket that is to be departed from, at the start of the gearshift than is the case in conventional derailleurs with oblique parallelogram.

This is again associated with the fact that, in the case of the abovementioned derailleurs with non-inclined or only slightly inclined gearshift parallelogram, the follow-up movement of the upper chain-guiding pulley along the cone-like tooth tip contour of the sprocket cassette, and thus the follow-up establishment of the correct chain gap between the chain-guiding pulley and sprocket cassette, begins not already with the lateral gearshift movements of the derailleur but only after the chain has engaged into the target sprocket, that is to say in this case after the engagement into the smaller sprocket, owing to the chain length that is then gradually freed up, which leads to a pivoting of the chain cage assembly clockwise as viewed from the outboard side. It is this pivoting of the chain cage owing to the chain length that is freed up with increasing engagement of the chain into the smaller sprocket that first ultimately leads to the restoration of the desired chain gap by virtue of the upper chain-guiding pulley of the tooth tip contour following the cassette and thus approaching this again in the radial direction of the cassette.

Owing to this chain gap that is still relatively large upon the initiation of the outboard gearshift operation, and the thus relatively great length of the traversing free chain section between the upper chain-guiding pulley and the larger sprocket that is to be departed from, and owing to the resulting trigonometric relationships that arise together with the above-described constant absolute dimension of the axial deflection of the derailleur, the chain should thus be provided with a relatively small skew angle during the outboard gearshift operation in order to be sufficiently laterally deflected in the region of the sprocket teeth of the larger sprocket in order that the chain can be captured by one of the specially designed descent teeth of the larger sprocket, deflected as intended laterally in an outboard direction, and thus guided onto the smaller sprocket at the intended gearshift position.

The correct displacement of the traversing chain section during outboard gearshifts is, owing to the chain gap that is large during the outboard gearshift operation and the thus relatively long traversing chain section, thus promoted by a relatively strong axial chain-guiding characteristic of the chain-guiding pulley, in the case of which, in other words, the axial displacement of the chain-guiding pulley by the above-described absolute dimension is transmitted by the derailleur as directly as possible to the traversing chain section between chain-guiding pulley and sprocket cassette.

If this is not the case, and if the skew angle of the traversing chain section is thus too large during the outboard gearshift operation, gearshift errors or delayed gearshift operations can occur, because the chain is then not deflected laterally in an outboard direction on one of the special descent teeth of the larger sprocket, and thus guided onto the smaller sprocket, in the intended manner.

Chain-guiding pulleys known in the industry as so-called X-Sync chain-guiding pulleys, which have alternating thick-thin teeth for engaging into the chain outer link plate links and chain inner link plate links respectively, have, in principle, a good axial chain-guiding characteristic of this type, and, owing to the associated axial guidance both of the chain inner link plates and of the chain outer link plates, can deflect the chain in a more exactly defined manner axially and more uniformly along its direction of revolution. In the case of the X-Sync chain-guiding pulleys known from the prior art, the toothing of which is commonly mirror-symmetrical with respect to a central plane of the chain-guiding pulley, this axial chain-guiding characteristic is however of equal magnitude or equal strength during outboard gearshift operations to that during inboard gearshift operations.

The above-described relationships that exist in the case of generic chain pulleys according to the prior art accordingly yield a conflict of aims: In the case of inboard gearshift operations, a relatively weak lateral chain-guiding characteristic of the upper chain-guiding pulley (in a chain pulley axial direction) is desired, but a relatively strong chain-guiding characteristic is desired in the case of outboard gearshift operations.

There are also further challenges. In the case of X-Sync chain-guiding pulleys known from the prior art with alternating thick-thin teeth, it is possible, for example during suspension compression movements of the rear wheel on the bicycle, for a lift-off of the chain from the chain-guiding pulley, and desynchronization between the chain and the tooth geometry of the chain-guiding pulley, to occur, in the case of which the thick teeth of the chain-guiding pulley no longer engage into the chain outer link plate links, as a result of which the chain rides up on the tooth tips of the chain-guiding pulley.

This is manifest in rough running of the chain and corresponding noises. In many cases, it is thereafter necessary to shift into a particular gear ratio and pedal backwards in order to cause the chain to jump over one tooth on the chain-guiding pulley, that is to say to jump back into the synchronized position.

There are furthermore conflicts of aims between the optimum values for the chain gap during inboard gearshift operations and during outboard gearshift operations and with regard to the desired largest possible angle of wrap of the chain on the chain-guiding pulley and on the sprocket and the thus actually desired forward positioning of the derailleur in relation to the structural space on the rear-end structure, which is always limited. This structural space, which can be utilized in the region of the dropout on the rear-end structure of the bicycle frame for the derailleur, is restricted by frame components, in particular in the region of the chain strut.

This has the effect that the orientation of the derailleur, the pivoting of the chain cage and the length thereof, and ultimately the angle of wrap of the chain about the upper chain-guiding pulley, involve compromises, and cannot be optimized fully or exclusively with regard to the best guidance of the chain by the chain-guiding pulley.

Specifically, for a good compromise between derailleur capacity, structural space of the rear-end structure and angle of wrap of the chain about the cassette and chain-guiding pulley, the derailleur is commonly arranged so as to be rotated further rearward, clockwise as viewed from the outboard side, than would be the case without allowance being made for the frame structural space. This leads in practice to a reduced angle of wrap about the chain-guiding pulley, which, in particular during outboard gearshift operations, results in non-optimal guidance of the chain by the chain-guiding pulley, in particular during gearshifts in the region of the largest sprockets, in the case of which the chain cage is pivoted anticlockwise to a great degree, as a result of which the angle of wrap of the chain-guiding pulley is yet further reduced, cf. for example FIG. 3 of EP2641823B1.

These conflicting objectives, which are present in the prior art, can lead to delayed shifting behavior and shifting errors, particularly during outboard gearshifts. The lower wrap angle of the chain on the upper chain guide pulley described above also makes it more difficult to resynchronize the chain if it runs desynchronized on the chain guide pulley.

The abovementioned aspects and conflicting objectives have the effect that, with chain-guiding pulleys according to the prior art, the sensibly usable range for the chain gap is considerably restricted, or in general, that conflicts arise between the geometric optimizations on the rear derailleur for inboard shifting and outboard shifting.

SUMMARY

Taking the above-described prior art as a starting point, it is thus the object of the present disclosure to provide a chain-guiding pulley, a bicycle derailleur and a bicycle drivetrain, with which the described disadvantages and conflicting objectives are overcome.

Generally, the chain-guiding pulley comprises a bearing region which is rotatable about an imaginary axis of rotation and which serves for receiving a bearing arrangement, for example a ball bearing, a tooth region with teeth formed thereon for engaging into a bicycle chain, and a supporting structure that connects the bearing region and the tooth region.

In one embodiment, on each of the inboard-side and the outboard-side side surfaces of at least one tooth of the chain-guiding pulley there are formed guide regions for lateral guidance of the chain along a direction that is parallel to the axial direction of the axis of rotation. Alternatively, the formed guide regions may be on several or all the teeth of the pulley.

In one embodiment, at least one inboard-side guide region of the at least one tooth has an at least regionally reduced thickness dimension, relative to a central plane of the chain-guiding pulley, in relation to at least one outboard-side guide region of the at least one tooth. The at least regionally reduced thickness dimension of the inboard-side guide region is configured in such a way, or has the effect, that a chain section running substantially tangentially off the chain-guiding pulley and for example traversing to a sprocket of a multi-sprocket assembly can, for example during a gearshift operation of the chain on the sprocket assembly, assume a greater skew angle in an outboard direction (that is to say during inboard gearshifts) than in an inboard direction (that is to say during outboard gearshifts) as viewed from the chain-guiding pulley.

The at least regionally reduced thickness dimension of the inboard-side guide region in relation to the outboard-side guide region of the at least one tooth accordingly has the effect that the lateral chain-guiding characteristic of the chain pulley, i.e., in an axial direction of the chain pulley, is less pronounced during the inboard gearshift operation than during the outboard gear-shift operation.

The desired strong axial chain-guiding characteristics of the chain-guiding pulley for the outboard gearshift operation are thus maintained, whereas the chain-guiding characteristics for the inboard gearshift operation are reduced.

In other words, the reduction in thickness of the inboard-side tooth-guiding region in relation to the outboard-side guiding region has the effect that the absolute dimension of the axial deflection of the traversing chain section in the region of the sprocket teeth during inboard gear-shifts is aligned with that during outboard gearshifts, and is thus made more uniform.

In one embodiment, at least one of the guide regions of the at least one tooth comprises an elevated thickened portion which projects beyond a face-side plane or side surface of the tooth region of the chain-guiding pulley in a chain pulley axial direction. The thickened portion is thus arranged in the tooth region of the chain-guiding pulley on an inboard-side or on an outboard-side side surface of the at least one tooth.

By means of the guide region configured as an elevated thickened portion, the axial guidance characteristics of the guide region can be adapted in the desired manner to the respective inner width of the chain inner link plate links and chain outer link plate links.

In one embodiment, the at least one guide element of the at least one tooth has, at least some areas, a thickness that decreases with increasing distance to the axis of rotation. In this way, it is possible to ensure that the traversing chain section runs off the chain-guiding pulley in a uniform and gradual manner with little vibration, in particular during a gearshift operation with corresponding skew of the chain. Furthermore, in this way, the chain is prevented from riding up onto the tooth tips of the chain-guiding pulley in an undesired manner during backpedalling.

In one embodiment, a region of decreasing thickness of the at least one guide element of the at least one tooth is configured as a bevel surface. The bevel surface defines a bevel plane which is arranged so as to be tilted relative to a chain-guiding pulley central plane along an axial direction of the chain-guiding pulley such that a radially inner delimiting edge of the bevel surface with a tooth region surface of the chain pulley or with a side surface of the at least one tooth is defined as a result of the tilting.

In one embodiment, the bevel plane and thus the bevel surface of the at least one tooth is, in addition to the abovementioned tilting along the axial direction, pivoted relative to the chain pulley central plane about a chain pulley radial line assigned to the at least one tooth in such a way that the radially inner delimiting edge of the bevel surface is provided with a profile which rises in a radially outward direction along an operating direction of rotation of the chain-guiding pulley.

In addition or as an alternative to this, said pivoting of the bevel plane may be configured in such a way, or have the effect, that the guide element of the at least one tooth has, at least in the region of the bevel surface, a thickness that increases from the load flank of the tooth towards the non-load flank thereof, that is to say a thickness which increases in the operating direction of rotation of the chain-guiding pulley.

The inner delimiting edge of the bevel surface, which rises in a radially outward direction in an operating direction of rotation of the chain-guiding pulley, or the thickness of the tooth guiding region that increases from the load flank of the tooth towards the non-load flank thereof, that is to say in the operating direction of rotation, on the one hand allows the traversing chain section to run off the chain-guiding pulley in a uniform and gradual manner, in particular during a gearshift operation with corresponding skew of the chain, and also prevents the chain from riding up onto the tooth tips of the chain-guiding pulley in an undesired manner during backpedalling. On the other hand, this design allows the desired strong guidance of the chain in the chain pulley axial direction for as long as the chain is not running off the chain pulley but is running on the chain pulley so as to be guided thereby.

In other words, it is hereby possible for the teeth of the chain pulley to have, for the chain section traversing substantially tangentially with respect to the sprocket cassette, a lesser axial guiding characteristic, in particular a guiding characteristic which is further considerably reduced on the inboard side in relation to the outboard side, but to have, for the chain section running on the chain pulley, a non-reduced, strong axial guiding characteristic both on the inboard side and on the outboard side.

In one embodiment, a flank angle of the load flank of the at least one tooth is shallower than a flank angle of the non-load flank of the at least one tooth. In one embodiment, a region around the tooth tip of the at least one tooth has an inclination predominantly towards the non-load flank of the tooth.

With the relatively shallow load flank angle and/or with the inclination of the tooth tip region predominantly towards the non-load flank, it is achieved that the chain can change over from possible undesired desynchronized running on a chain pulley with thick-thin teeth more easily, rapidly and in a defined manner back to synchronous running on the chain pulley, or that desynchronization is prevented from occurring. In particular, the tooth tip region that slopes downward towards the non-load flank has the effect that the desynchronized chain, which thus rides up radially outwardly on the tooth flanks or tooth tips, generates a relative torque between the chain and the chain pulley, which relative torque has the effect that the chain pulley rotates relative to the chain until the chain moves into synchronized engagement with the chain pulley again and stabilizes there. Also, a steeper angle of the non-load flank of the teeth of the chain-guiding pulley (which becomes a load flank in the case of backpedalling) counteracts a desynchronization of the chain, such that this occurs less frequently overall.

The disclosure can be implemented on any chain pulley by virtue of an inboard-side guide region of the at least one tooth, or alternatively all teeth, being provided as described above with the described at least regionally reduced thickness dimension in relation to an outboard-side guide region of the tooth, preferably of all teeth of the chain pulley.

The chain-guiding pulley however may have an even-numbered plurality of teeth which are assigned, in alternating fashion in a circumferential direction, to in each case one first or one second tooth group. The teeth of the first tooth group are narrow teeth, which are narrower than a chain inner link plate spacing of the chain, such that these narrow teeth can easily enter the link plate intermediate space between the inner link plates, which are situated relatively close together, of an inner link plate chain link.

The teeth of the second tooth group comprise at least one wide tooth, and it is preferable for several or all teeth of the second tooth group to be of wide design such that the wide teeth can enter only the link plate intermediate space between the outer link plates, which are situated relatively far apart, of an outer link plate chain link, but cannot enter the link plate intermediate space of an inner link plate chain link.

In other words, this means that the chain-guiding pulley may be designed as a so-called X-Sync™ chain-guiding pulley, which has alternating thick-thin teeth. This has the advantage that the lateral guiding action of the chain-guiding pulley along the chain pulley axial direction on the chain section traversing substantially tangentially between the chain-guiding pulley and the sprocket cassette is increased overall, which increases gearshift precision. Furthermore, in this way, the guiding action of the thick teeth in relation to the outer link plate chain links is aligned with the guiding action of the thin teeth in relation to the inner link plate chain links and is thus made more uniform. This, too, serves to improve the gearshift precision during gearshifts between different sprockets of the sprocket cassette.

In one embodiment at least one tooth of the first tooth group, or alternatively all teeth of the first tooth group, has a reduced tooth height in a radial direction, in relation to at least one tooth, in relation to all teeth of the second tooth group.

This reduced height of the teeth of the first tooth group, i.e., the narrow teeth provided for engaging into the inner link plate chain links, also has the effect that the chain section traversing between the chain-guiding pulley and sprocket cassette is guided laterally in a chain pulley axial direction on the alternating thick-thin teeth in a more uniform manner. On the other hand, this embodiment likewise contributes to a situation in which a chain that rides up on the chain-guiding pulley for example in a desynchronized manner, and thus on the tooth tips of the thick teeth, is rapidly transferred back into the synchronized position, in particular in interaction with the tooth tips of the thin teeth, too, which may slope down more steeply towards the non-load flank.

In one embodiment, one or both flank angles of at least one tooth, alternatively several or all teeth, of the first tooth group, i.e., the thin teeth, are shallower than the corresponding flank angle of at least one tooth, alternatively several or all teeth, of the second tooth group, i.e., the thick teeth.

This design of the flank angles on the teeth of the chain-guiding pulley also serves to improve the resynchronization of the chain should this run on the chain pulley in an undesirably desynchronized manner, in particular with one or more inner link plate chain links on the tooth tips of the thick teeth. Allowance is thus made for the fact that the contribution of the thin teeth to the resynchronization of a desynchronized chain is less than the contribution of the thick teeth, because, in the desynchronized state, the thin teeth are scarcely in contact with the chain link plates, as a result of which the thin teeth have to be predominantly only passively overcome by the chain in order for the chain to be brought back into the synchronized state.

The disclosure furthermore may relate to a rear bicycle derailleur, which has a base element, also known in the industrial sector as B-knuckle, which is connectable to a bicycle rear frame, a gearshift element, also known in the industry as P-knuckle, which is movable relative to the base element by means of a pivot mechanism, and a chain-guiding device, also known as chain cage or cage assembly, which is pivotably connected to the gearshift element and which has an upper and a lower chain-guiding pulley.

The disclosure furthermore may relate to a bicycle drivetrain which comprises at least one front sprocket or chainring, a rear multi-sprocket arrangement, also referred to as sprocket cassette, and a rear derailleur with an upper and a lower chain pulley. The bicycle derailleur and the bicycle drivetrain are distinguished by a chain-guiding pulley with teeth as described above.

According to one embodiment of the bicycle drivetrain, the sprocket cassette has at least one sprocket with an even numbered of plurality of teeth which are assigned, in alternating fashion in a circumferential direction, to in each case one first or one second tooth group. The teeth of the first tooth group are narrow teeth, which are narrower than a chain inner link plate spacing, and the second tooth group comprises at least one wide tooth; alternatively relates to several or all teeth of the second tooth group, the width of which is greater than a chain inner link plate spacing. The wide tooth or teeth of the at least one sprocket of the sprocket cassette can thus protrude fully only into the link plate intermediate space of an outer link plate chain link but not into the link plate intermediate space of an inner link plate chain link.

A further embodiment of the bicycle drivetrain is distinguished by the fact that the rear derailleur is a straight-pin derailleur with a non-inclined or only slightly inclined gearshift parallelogram. For more precise specification of the geometry and the characteristics of the straight-pin derailleur, reference is made to the introductory part of the description further above.

From the interaction of all of the components of the bicycle drivetrain as described above and below in the description of the figures, it is clear to a person skilled in the art that the design of the chain-guiding pulley according to the disclosure has influences on the bicycle derailleur as a whole and on the bicycle drivetrain as a whole. In particular, owing to the thus achievable direction-specific improvement of gearshift precision in an inboard direction and in an outboard direction, and owing to the improved and more uniform chain guidance, the chain-guiding pulley according to the disclosure allows adaptations and optimizations of the other components of the drivetrain, in particular of the sprocket cassette and of the derailleur, including the dimensioning of the derailleur geometry and including the arrangement and positioning of the derailleur relative to the bicycle frame or frame rear-end structure, which adaptations and optimizations would not be possible, or would lead to impairments during operation and during gearshift operations, without the chain-guiding pulley according to the disclosure.

For example, by means of the chain-guiding pulley according to the disclosure, the gear-shift features or gearshift channels of the sprocket cassette, in particular those for gearshifts in an inboard direction, can be made more distinct or more defined without this resulting in an increase in premature gearshift operations. Likewise, owing to the improved chain-guiding characteristics in a chain pulley axial direction, and owing to the improved synchronization characteristics of the chain pulley according to the disclosure, the drivetrain as a whole can be made more compact and positioned in a more flexible manner relative to the frame rear-end structure.

It is thus clear to a person skilled in the art that a derailleur equipped with the chain-guiding pulley according to the disclosure or a bicycle drivetrain equipped with such a derailleur, both on its own and as a coordinated overall system, yields considerable improvements both with regard to the structural design of the drivetrain as a whole and during riding operation and gear-shift operations.

Embodiments of the disclosure will be described by way of example below on the basis of the figures. The applicant points out that all figures are based on a CAD model of a preferred exemplary embodiment and are true to scale, and therefore any relationships or dimensions not specifically described can be gathered from the figures.

BRIEF DESCRIPTION OF THE DRAWINGS

In the figures:

FIG. 8 shows a chain-guiding pulley of FIGS. 4 to 7 together with a chain section in a rotated side view of the outboard side of the chain pulley, with indicated viewing directions A and B;

FIG. 9 shows the chain-guiding pulley with the chain section of FIG. 8 from the viewing direction A of FIG. 8 (from above in relation to the bicycle) during an inboard gearshift operation;

FIG. 10 shows the chain-guiding pulley with the chain section of FIGS. 8 and 9 with a sprocket pair of FIG. 5 from viewing direction B of FIG. 8 (from the rear in relation to the bicycle) during an outboard gearshift operation;

FIG. 11 shows the chain-guiding pulley with the chain section of FIGS. 8 to 10 from viewing direction A of FIG. 8 (from above in relation to the bicycle) during an inboard gearshift operation;

FIG. 12 shows the chain-guiding pulley with the chain section of FIGS. 8 to 11 with a sprocket pair of FIG. 5 from viewing direction B of FIG. 8 (from the rear in relation to the bicycle) during an outboard gearshift operation;

FIG. 19 shows the chain-guiding pulley of FIGS. 4 to 18 in an enlarged detail illustration in a view from the rear;

FIG. 20 shows the chain-guiding pulley of FIGS. 4 to 19 in a side view from an in-board side;

FIG. 21 shows the chain-guiding pulley of FIG. 20 in a side view from an outboard side;

FIG. 22 shows an enlarged detail A of the chain-guiding pulley of FIG. 20;

FIG. 23 shows an enlarged detail B of the chain-guiding pulley of FIG. 21;

DETAILED DESCRIPTION

Positional and directional terms such as "left", "right", "front", "rear", "top", "bottom" etc. used in the following description correspond to the rider's perspective on a bicycle. This applies correspondingly to the directional terms "inboard" (left or to the left or in the direction of a larger sprocket of a sprocket cassette) and "outboard" (right or to the right or in the direction of a smaller sprocket of a sprocket cassette) used in the description which are customary in the industrial sector, and which relate specifically to gearshift operations or sprocket positions on the sprocket cassette.

Figure 1:
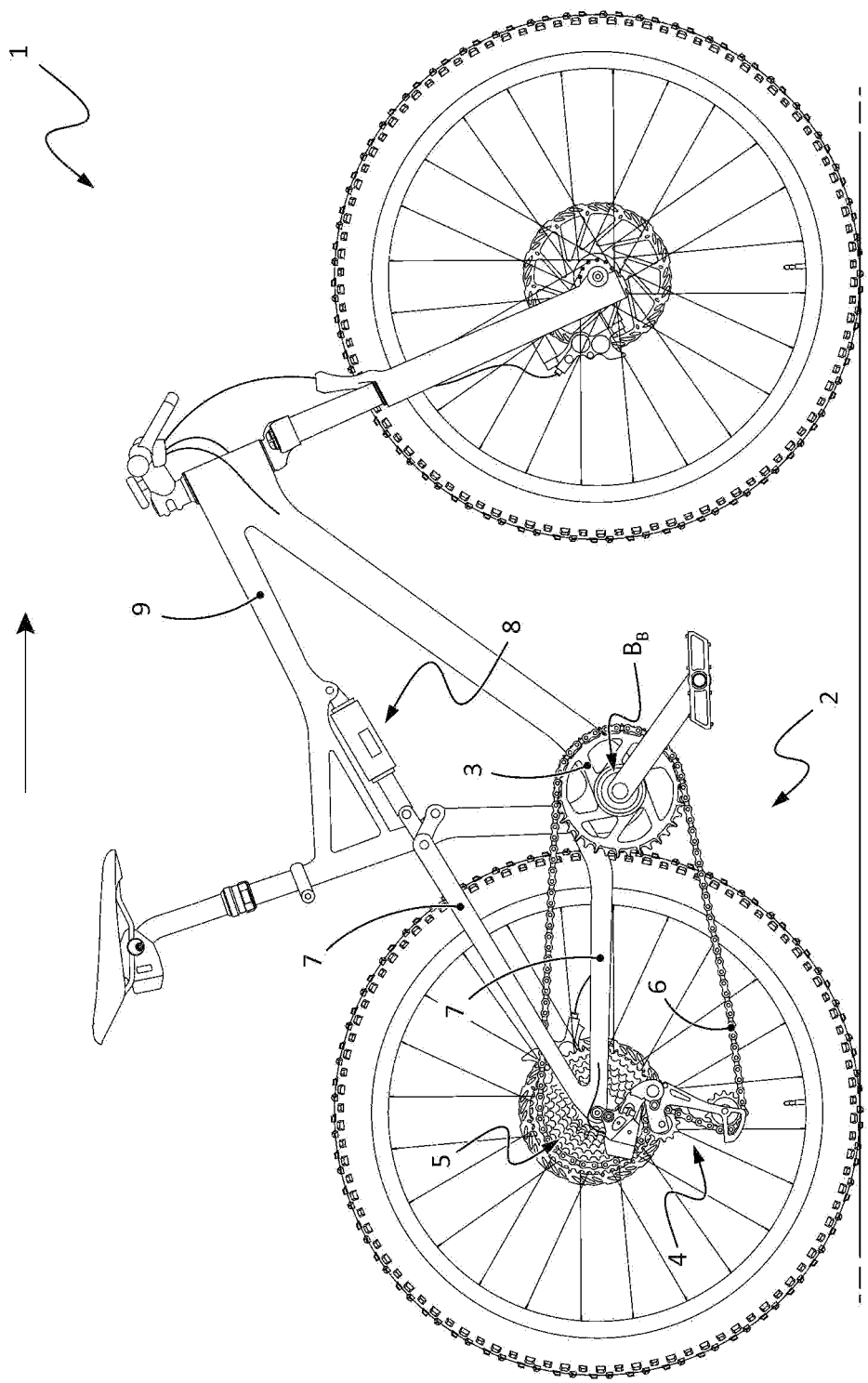
FIG. 1 shows a mountain bike with a 1× drivetrain with a single chainring, with a sprocket cassette and with a rear derailleur.

FIG. 1 shows a mountain bike 1 with a 1× drivetrain 2, i.e., a drivetrain with a single chainring 3, a rear derailleur 4, a multi-sprocket cassette 5 and a chain 6. The drivetrain is located in the area of a rear frame 7, which is pivotally connected to a front frame 9 by a spring/damper device 8. By contrast to FIG. 5 et seq. with the flat-top chain shown therein in some cases, the mountain bike according to FIG. 1 is equipped with a conventional chain.

Figure 2:
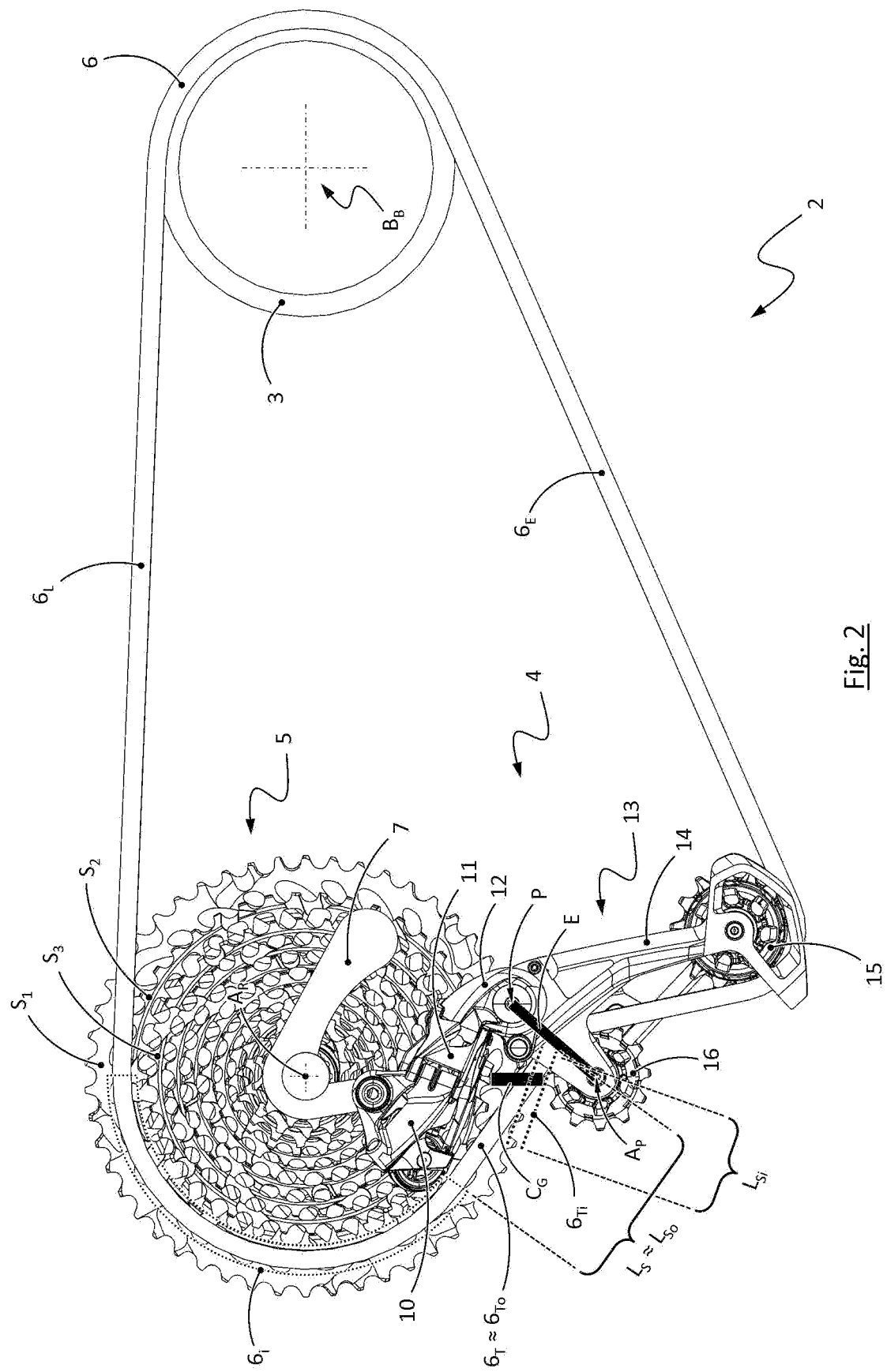
FIG. 2 shows the drivetrain including a derailleur of a mountain bike of FIG. 1.

FIG. 2 shows the drivetrain 2 of the mountain bike 1 according to FIG. 1 in an enlarged illustration in relation to FIG. 1, wherein the chainring 3 and the rear frame 7 are only schematically indicated in FIG. 2.

With regard to the derailleur 4, it is possible to see a base element 10, also known in the industry as a B-knuckle, which is connected to the rear frame 7 and which is connected by means of a parallelogram-like pivot arrangement 11 to a gearshift element 12, also referred to in the industry as a P-knuckle, which is movable substantially horizontally relative to the base element 10. A chain-guiding device 13, also known as chain cage assembly or chain cage, is connected to the gearshift element 12 so as to be pivotable in spring-loaded fashion about an axis P.

The chain-guiding device 13 comprises the chain cage 14 and a lower chain-tensioning pulley 15 for receiving the return strand $6_E$ of the chain 6 and for maintaining the chain tension. Furthermore, the chain-guiding device 13 comprises an upper chain-guiding pulley 16 for guiding the chain 6 onto the sprockets of the sprocket cassette 5.

A chain section $6_T$ of the chain 6 traversing between the chain-guiding pulley 16 and a sprocket of the sprocket cassette 5 is also changed over between the various sprockets of the sprocket cassette 5 during gearshift operations by way of the upper chain-guiding pulley 16.

1× drivetrains as shown in FIG. 1 or 2, i.e., with only one chainring and with widely spread toothed ring cassettes, which often have a gear ratio spread of the cassette of for example 400% or more between the highest and the lowest gear ratio, have become established in higher-end mountain bikes in recent years.

Among other things, in order to keep operating forces low during gearshifts between the various gear ratios of the cassette, rear derailleurs with a non-inclined or only slightly inclined parallelogram are primarily used in combination with such cassettes. Such derailleurs are known, for example, from the documents EP2641823B1 and EP3388324A3, as discussed in detail above in the introduction to the description. Such a derailleur is also present in the case of the drivetrain according to FIGS. 1 and 2.

In order to maintain a suitable so-called chain gap $C_G$ (radial spacing between chain-guiding pulley 16 and sprocket of the sprocket cassette 5, visualized in FIG. 2 by the black bar $C_G$), the distance E between the axis $A_P$ of the chain-guiding pulley 16 of the rear derailleur 4 and the pivot axis P of the P-knuckle is greatly increased in such derailleurs 4 compared to conventional rear derailleurs with an oblique parallelogram.

A consequence of this is that, in such derailleurs 4, the chain gap $C_G$ is much more heavily dependent on the chain length and on other factors, for example on any suspension kinematics of a rear suspension 8 and the wear of the chain 6 that occurs over time. As a result, in the case of such derailleurs 4 with non-inclined or slightly inclined parallelogram 11, the drivetrain reacts with altogether considerably greater sensitivity to the size of the chain gap $C_G$ than in the case of conventional derailleurs with an oblique parallelogram.

Thus, in the case of such derailleurs 4 with non-inclined or slightly inclined parallelogram 11, the chain gap $C_G$ plays a central role in the function of the gearshift system and of the drivetrain. Said chain gap is primarily responsible for ensuring that the form elements for gear-shift and deflecting functions (cf. FIG. 5) in the region of the gearshift channels of the sprockets of the toothed ring cassette 5 are correctly used, that the chain 6 is thus shifted at those rotational positions of the cassette 5 which are intended for this and is deflected at those rotational positions of the cassette 5 which are not intended for this, and that, overall, no components of the drivetrain are damaged as a result of poor gearshift quality or collisions.

The chain gap $C_G$ furthermore also influences the length $L_s$ of the chain section $6_T$ traversing between the chain-guiding pulley 16 and that sprocket $S_2$ of the sprocket cassette 5 which is presently in engagement with the chain 6. However, during actual gearshift operations, the length $L_s$ of the traversing chain section $6_T$ is even more heavily influenced by the gearshift position of the derailleur gearshift element 12 along the gearshift direction that is substantially parallel to the rear axle $A_R$.

In this regard, it can be seen in FIG. 2 that the chain section $6_T$ traversing between the chain-guiding pulley 16 and the second-largest sprocket $S_2$ has the length $L_s$. This length $L_s$ of the traversing chain section $6_T$ is present when the chain 6 is shifted onto the second-largest sprocket $S_2$ during riding operation.

The traversing chain section $6_T$ also has approximately the same length $L_{So} \approx L_s$ when, for example and as indicated in FIG. 2, a gearshift is performed in an outboard direction from the second sprocket $S_2$ onto the third sprocket $S_3$, specifically at the start of the gearshift operation, when that region $6_i$ of the chain 6 which is in engagement with the sprocket cassette is initially still situated entirely on the second-largest sprocket $S_2$.

During a corresponding inboard gearshift operation, however, the traversing chain section $6_{Ti}$ is significantly shorter than during normal running of the chain and during outboard gearshift operations, as indicated in FIG. 2 by the dotted profile $6_{Ti}$ of the chain section $6_{Ti}$ which is in this case traversing onto the largest sprocket $S_1$ already immediately after the start of the outboard gearshift operation.

Figure 3:
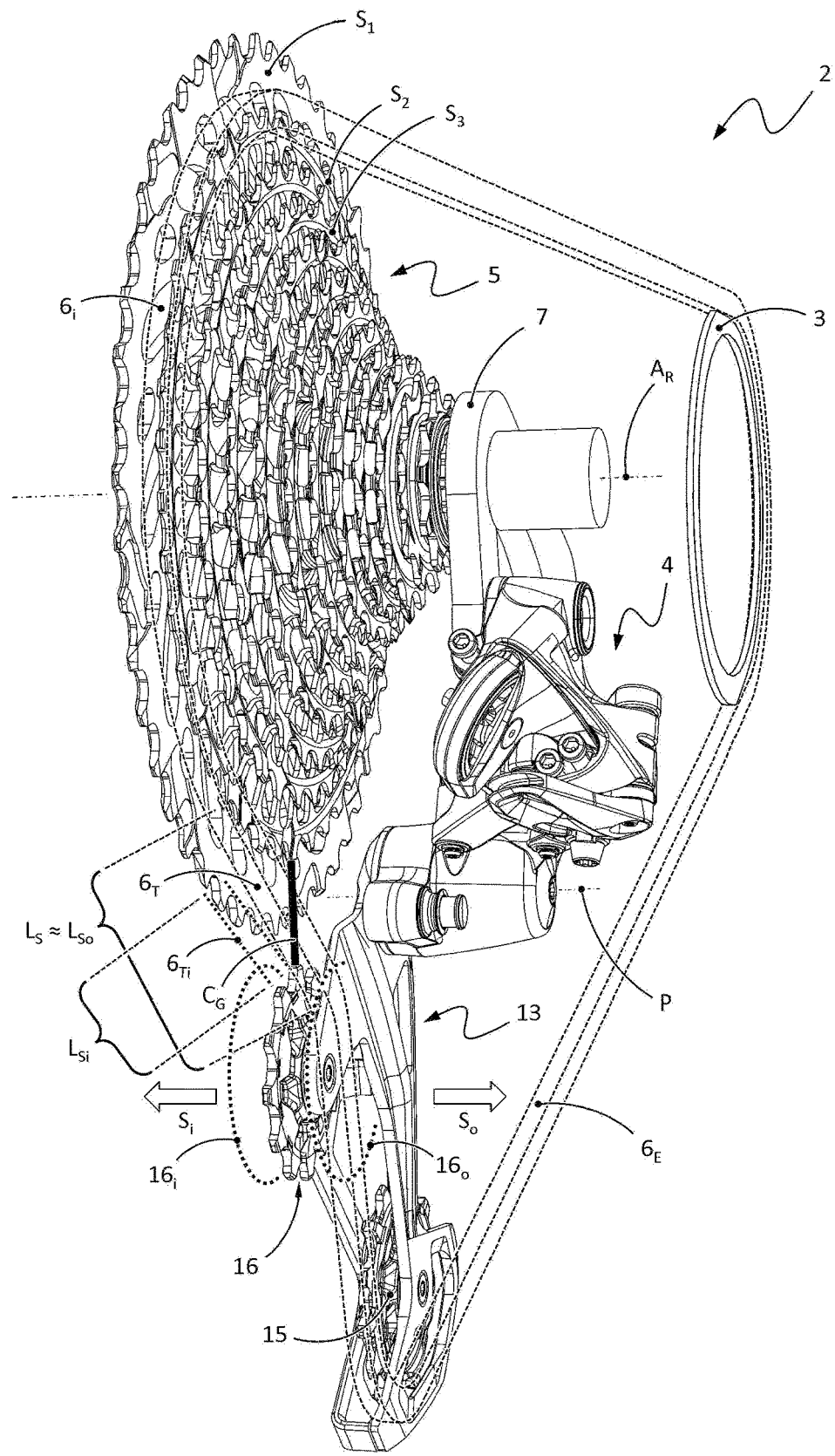
FIG. 3 shows the drivetrain including a derailleur of FIG. 2 in a perspective oblique view from the rear.

To better illustrate these relationships with the gearshift operation of the derailleur 4, the important geometrical values are illustrated once again in the perspective oblique view of the drivetrain 2 in FIG. 3. It can be seen that the chain 6 has firstly been shifted onto the second-largest sprocket $S_2$ resulting in a chain gap $C_G$ of a structurally provided length between the chain-guiding pulley 16 and the sprocket $S_2$. The chain gap $C_G$ leads, together with the spatial relative positions of the chain-guiding pulley 16 and the sprocket $S_2$, to a length $L_s$ of the chain section $6_T$ traversing between the chain-guiding pulley 16 and the sprocket $S_2$.

This length $L_s$ for the traversing chain section $6_T$ is initially substantially maintained (as length $L_{So}$) even during an outboard gearshift operation $S_o$, that is to say when the gearshift element 12 of the derailleur 4 has moved in an outboard direction, that is to say to the right in the drawing, substantially horizontally and parallel to the rear axle $A_R$ until the chain-guiding pulley 16 is situated vertically below the next smaller sprocket $S_3$. The latter is indicated in FIG. 3 by the dotted position $16_o$ of the chain-guiding pulley 16.

Figure 7:
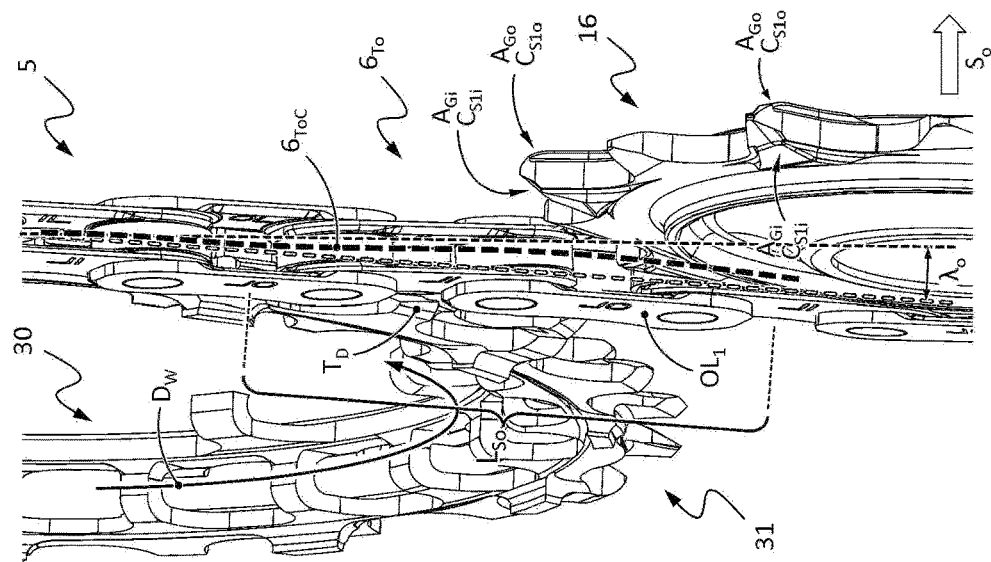
FIG. 7 shows the chain-guiding pulley, the chain section and the sprocket pair of FIGS. 5 and 6 in an enlarged perspective view from the rear as per the detail A in FIG. 5 during an outboard gearshift operation.

This length $L_{So} \approx L_s$, which initially remains virtually unchanged during the outboard gearshift operation $S_o$, of the traversing chain section $6_{To} \approx 6_T$ is based on the fact that, at the start of the outboard gearshift operation $S_o$, the chain section $6_i$ situated on the cassette continues to run on the sprocket $S_2$ that is to be departed from, until such time as an outboard gearshift channel with corresponding gearshift teeth is reached on the same sprocket $S_2$, whereby the traversing chain section $6_T$ begins to change over onto the target sprocket $S_3$ (cf. FIG. 7). It is thus however the case that, for the correct initiation of the outboard gearshift operation $S_o$, the length $L_{So} \approx L_s$ and direction of the traversing chain section $6_{To} \approx 6_T$ are of decisive importance for as long as that section $6_i$ of the chain 6 which is situated on the sprocket cassette 5 still runs entirely on the sprocket $S_2$ that is to be departed from whilst the chain-guiding pulley 16 is already situated in the target gearshift position at $16_o$.

In the reverse situation, that is to say in the case of an inboard gearshift operation $S_i$, for example from the second-largest sprocket $S_2$ onto the largest sprocket $S_1$, that is to say to the left in the drawing in FIG. 3, for which the substantially horizontally movable gearshift element 12 moves the upper chain-guiding pulley 16 into the position $16_i$, which is likewise illustrated by dotted lines, it is however the case already at the start of the gearshift operation that the traversing chain section $6_{Ti}$ illustrated again by dotted lines in FIG. 3 assumes the considerably shorter length $L_{Si}$, as already indicated above with regard to the illustration in FIG. 2.

Figure 6:
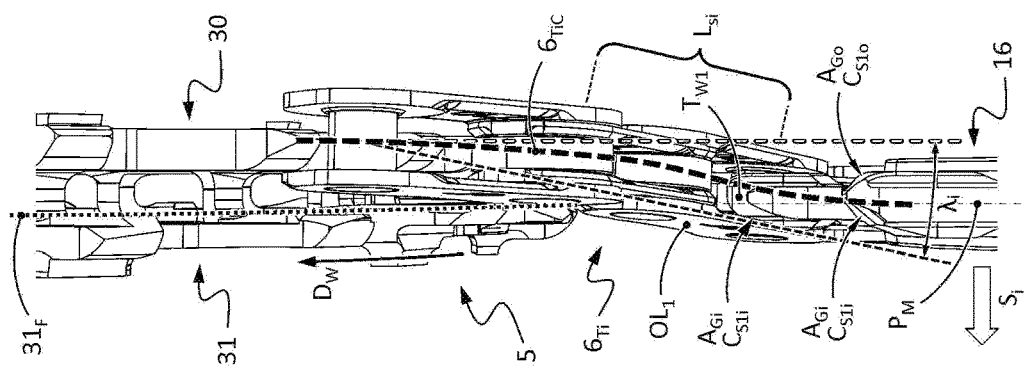
FIG. 6 shows the chain-guiding pulley, the chain section and the sprocket pair of FIG. 5 in an enlarged view from the rear as per the detail and viewing direction A in FIG. 5 during an inboard gearshift operation.
Figure 5:
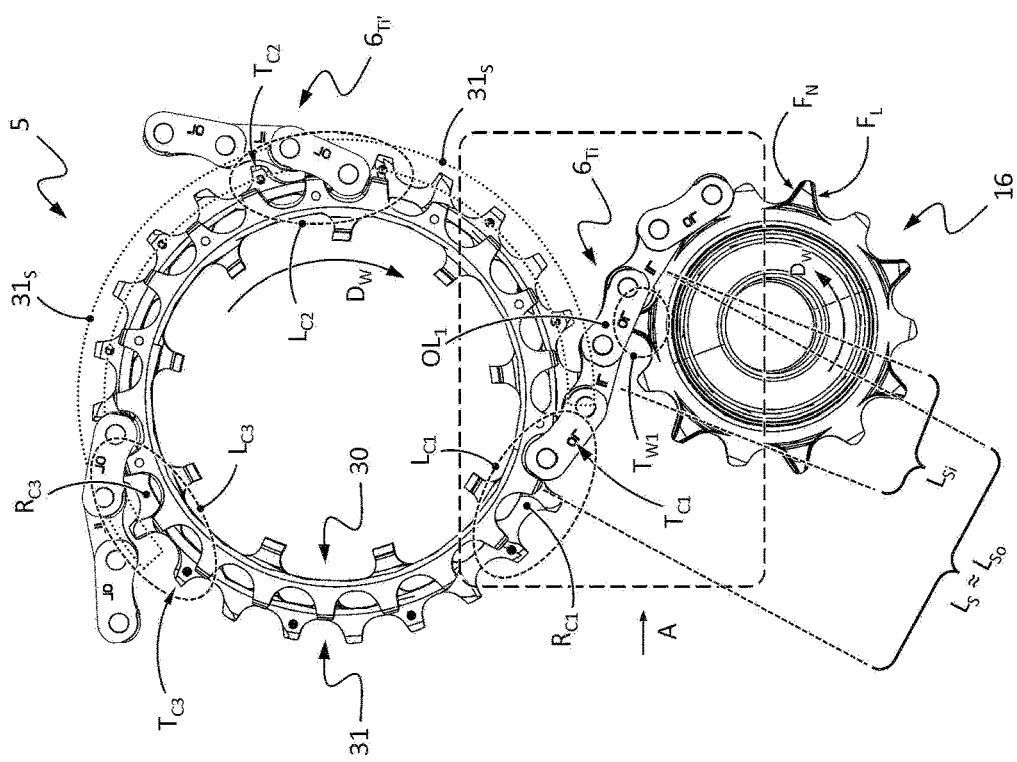
FIG. 5 shows the chain-guiding pulley, a chain section and a sprocket pair of the sprocket cassette of FIG. 4 in a side view from an outboard side during an inboard gearshift operation, with an indicated detail A and associated viewing direction.

This is associated with the fact that, during inboard gearshift operations $S_i$, the traversing chain section $6_{Ti}$ of the chain 6 is pressed with its inboard-side edge against the outboard-side face surface of the larger sprocket $S_1$ already at the start of the gearshift operation, and slides on said face surface until such time as a suitable outboard gearshift channel on the target sprocket $S_1$ is reached, following which the traversing chain section $6_{Ti}$ abruptly changes over onto the target sprocket $S_1$ (cf. FIGS. 5 and 6).

In other words, with regard to the difference between the inboard gearshift operation $S_i$ and the outboard gearshift operation $S_o$, it is to be noted that, during the inboard gearshift operation $S_i$, the traversing chain section $6_{Ti}$ is always captured by a gearshift channel on the larger target sprocket, for which reason there is generally a relatively short traversing chain section $6_{Ti}$ during the inboard gearshift operation $S_i$, whereas in the case of the outboard gearshift operation $S_o$, the traversing chain section $6_{To}$ interacts with a gearshift channel on the sprocket that is to be departed from, for which reason there is generally a relatively long traversing chain section $6_{To}$ during the outboard gearshift operation $S_o$. Altogether, the chain 6 and sprocket cassette 5 in the prior art thus exhibit a fundamentally greater proclivity towards gearshifts owing to the substantially smaller chain gap $C_G$ in the case of inboard gearshifts $S_i$ than in the case of outboard gearshifts $S_o$.

Figure 4:
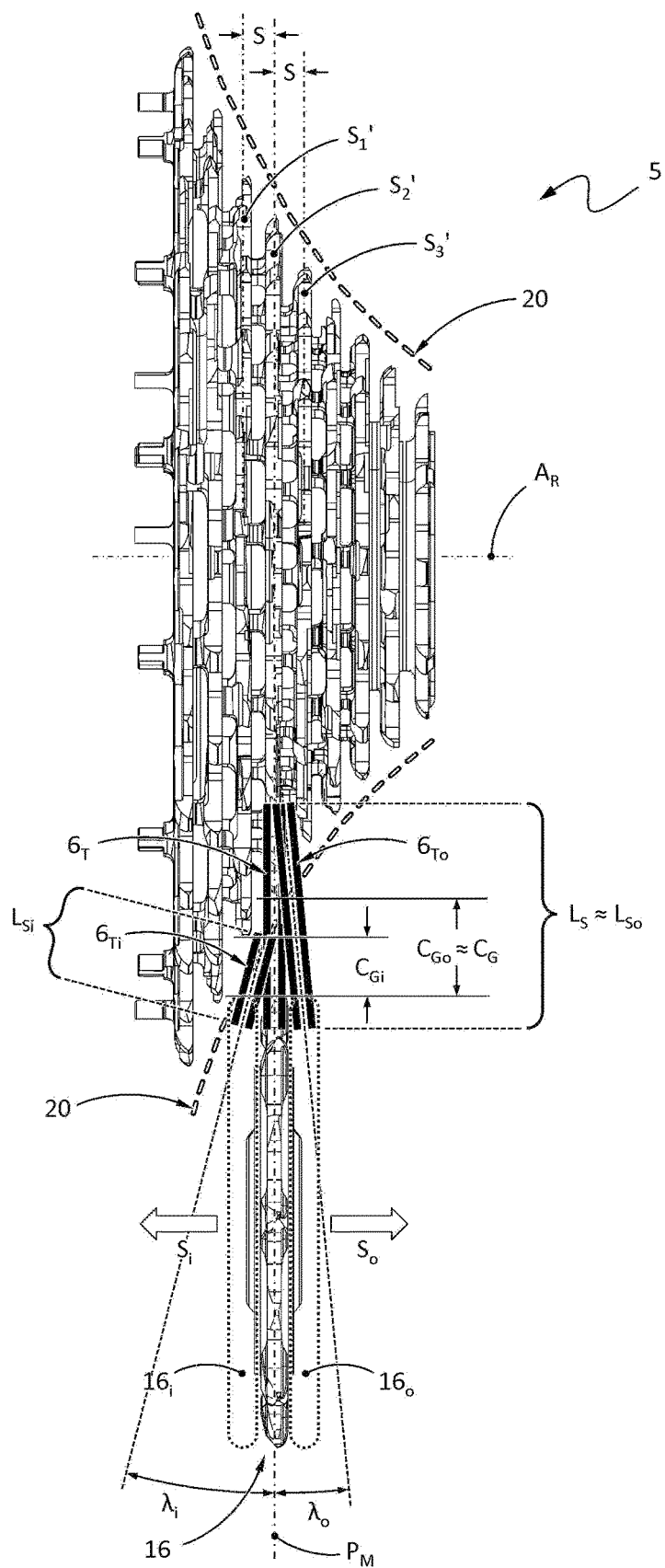
FIG. 4 shows parts of the sprocket cassette, and a chain-guiding pulley, of a drivetrain similar to FIGS. 1 to 3 in a view from the rear, with schematically indicated chain profiles during gearshift operations.

These relationships are schematically visualized once again in FIG. 4. It is possible to see a part of the sprocket cassette 5, furthermore an upper chain-guiding pulley 16, and (indicated highly schematically in the form of double lines) firstly the traversing chain section $6_T$ during normal, straight chain running on the sprocket $S_2'$, secondly the chain section $6_{Ti}$ traversing between the target sprocket $S_1'$ and chain-guiding pulley 16 during inboard gearshift operations $S_i$ from the starting sprocket $S_2'$ to the larger target sprocket $S_1'$, and thirdly the traversing chain section $6_{To}$ during outboard gearshift operations $S_o$ from the sprocket $S_2'$ to the smaller target sprocket $S_3'$.

As discussed in the introductory part of the description and as shown in FIGS. 1 to 3, for the reasons mentioned for example in document EP2641823B1, the derailleur 4 in question has no oblique parallelogram that would, during the gearshift operation, cause the chain-guiding pulley 16 to follow the tooth tip contour 20 indicated by dashed lines in FIG. 4 directly during the gearshift operation. Rather, the derailleur 4 is a straight-pin derailleur with non-inclined or only slightly inclined gearshift parallelogram 11, for which reason the upper chain-guiding pulley 16 is displaced initially substantially horizontally by the gearshift parallelogram 11 both during inboard gearshift operations $S_i$ and during outboard gearshift operations $S_o$.

In the case of such derailleurs 4 with non-inclined or only slightly inclined parallelogram 11, as described further above, the vertical component of the follow-up movement of the chain-guiding pulley 16 along the tooth tip contour 20 of the sprocket cassette 5 takes place, owing to the large spacing E between the axis $A_P$ of the chain-guiding pulley 16 and the pivot axis P of the chain cage 13, initially gradually during the further rotation of the sprocket cassette 5, until such time as that region $6_i$ of the chain 6 (cf. FIG. 2) which is in engagement with the sprocket cassette 5 is fully in engagement either with the larger target sprocket $S_1$, $S_1'$ or with the smaller target sprocket $S_3$, $S_3'$.

The cause of this is that, during inboard gearshift operations $S_i$ with such derailleurs 4 with non-inclined or only slightly inclined gearshift parallelogram 11, the chain cage 13 is, after the movement of the chain-guiding pulley 16 by the derailleur 4 into the position $16_i$, only then gradually pivoted anticlockwise about its pivot axis P by the chain 6 traversing onto the larger sprocket $S_1$, $S_1'$, and thus the vertical follow-up movement of the upper chain-guiding pulley 16 along the cone-like tooth tip contour 20 of the sprocket cassette 5 begins for the first time when the chain 6 is already engaging into the larger sprocket $S_1$, $S_1'$. Thus, in the case of such derailleurs 4, the complete pivoting of the chain cage 11 and thus the desired vertical follow-up movement of the chain-guiding pulley 16 and the establishing of the desired chain gap $C_G$ between the chain-guiding pulley 16 and the larger sprocket $S_1$, $S_1'$ ends only when the chain 6 has departed entirely from the previous sprocket $S_2$, $S_2'$ and is running entirely on the larger sprocket $S_1$, $S_1'$.

A similar situation applies to outboard gearshift operations $S_o$, in the case of which the chain-guiding pulley 16 is moved by the derailleur 4 initially substantially horizontally to the right, or in an outboard direction, into the position $16_o$, and in the case of which the vertical component of the follow-up movement of the chain-guiding pulley 16 along the tooth tip contour 20 of the sprocket cassette 5 takes effect only after further rotation of the sprocket cassette 5, and only with the complete pivoting of the chain cage 11, when that region $6_i$ of the chain 6 (cf. FIG. 2) which is in engagement with the sprocket cassette has departed entirely from the starting sprocket $S_2$, $S_2'$ and is running entirely on the smaller target sprocket $S_3$, $S_3'$.

Thus, in the case of outboard gearshift operations $S_o$, the chain cage 13 is gradually pivoted clockwise about its pivot axis P by the chain 6 traversing onto the smaller sprocket $S_3$, $S_3'$, and thus the upper chain-guiding pulley 16 is caused to perform a vertical follow-up movement along the cone-like tooth tip contour 20 of the sprocket cassette 5, only when the chain 6 is already engaging into the smaller sprocket $S_3$, $S_3'$.

In the case of the derailleurs 4 in question with non-inclined or only slightly inclined gearshift parallelogram 11, it is thus the case during gearshift operations that the chain gap $C_G$, that is to say the spacing between the upper chain-guiding pulley 16 and the respective target sprocket $S_1$, $S_1'$ or $S_3$, $S_3'$, is first varied by the pivoting of the chain cage 13, which takes place after the start of the gearshift operation.

Referring further to FIG. 4, this means that, during an inboard gearshift operation $S_i$, the chain-guiding pulley 16 is displaced horizontally in an inboard direction into the position $16_i$ already before the start of the pivoting of the chain cage 13, and thus before the adaptation of the chain gap that takes place only during the further course of the gearshift operation, as a result of which, at the start of the inboard gearshift operation $S_i$, the chain-guiding pulley 16 pushes the traversing chain section $6_{Ti}$ towards the larger sprocket with only a small radial spacing $C_{Gi}$.

As a result, the chain section $6_{Ti}$ (cf. FIGS. 2 and 3) traversing from the chain-guiding pulley 16, which has been shifted in an inboard direction and is in its position $16_i$, onto the larger target sprocket $S_1'$ also has a length $L_{Si}$ significantly shorter than the chain section $6_T$ that was previously running between the chain-guiding pulley 16 and the sprocket $S_2'$ to be departed from, which had the length $L_S$.

During outboard gearshift operations $S_o$, the chain-guiding pulley 16 is displaced by the derailleur 4 initially substantially purely horizontally to the right, or in an outboard direction, into the position $16_o$ of FIG. 4, and the vertical component of the follow-up movement of the chain-guiding pulley 16 along the tooth tip contour 20 of the sprocket cassette 5 first takes place, as described above, after further rotation of the sprocket cassette 5.

As a result, the chain section $6_{To}$ traversing from the chain-guiding pulley 16, which has been shifted in an outboard direction and is in its position $16_o$, onto the smaller target sprocket $S_3'$ has a length $L_{So}$ approximately equal to the chain section $6_T$ that was previously running between the chain-guiding pulley 16 and the sprocket $S_2'$ to be departed from, which had the length $L_S$.

In other words, this means that the chain gap $C_{Go}$ and the length $L_{So}$ of the traversing chain section $6_{To}$ during outboard gearshifts $S_o$ is significantly greater than the chain gap $C_{Gi}$ and the length $L_{Si}$ of the traversing chain section $6_{Ti}$ during inboard gearshifts $S_i$.

During current bicycle gearshift operations, referred to uniformly as indicated bicycle gearshift operations, the horizontal movement travel of the chain cage 13 and thus of the chain-guiding pulley 16 in an axial direction $A_R$ takes place substantially in constant steps in accordance with the spacings S of the sprockets of the sprocket cassette 5.

With this constant absolute dimension S of the axial deflection by the derailleur 4 during every gearshift operation, in combination with the considerably larger chain gap $C_{Go}$ during the outboard gearshift operation $S_o$ and the considerably greater length $L_{So}$ of the traversing chain section $6_{To}$ during the outboard gearshift operation $S_o$ in relation to the considerably smaller chain gap $C_{Gi}$ during the inboard gearshift operation $S_i$ or the considerably smaller length $L_{Si}$ of the traversing chain section $6_{Ti}$ during the inboard gearshift operation $S_i$, trigonometric relationships thus result in a skew angle $\lambda_i$ for the traversing chain section $6_{Ti}$ during inboard gearshift operations $S_i$ that is considerably greater than the skew angle $\lambda_o$ of the traversing chain section $6_{To}$ during outboard gearshift operations $S_o$.

With the use of an upper chain-guiding pulley according to the prior art, which in an axial direction is commonly of mirror-symmetrical construction with respect to its central plane $P_M$ and which thus has identical lateral chain-guiding characteristics along the chain pulley axial direction and equal skew angles $\lambda_i = \lambda_o$ both during inboard gearshifts $S_i$ and during outboard gear-shifts $S_o$, the considerably shorter traversing chain section $6_{Ti}$ during inboard gearshifts $S_i$ thus leads, in the case of an unchanged skew angle $\lambda_i = \lambda_o$ of this traversing chain section $6_{Ti}$, to a considerably more pronounced displacement of the traversing chain section $L_{Si}$ in a chain pulley axial direction or horizontally, and thus to a considerably more pronounced and possibly premature gearshift action onto the larger sprocket $S_1$, $S_1'$ owing to the action of the chain pulley (cf. FIG. 6). This is because a chain pulley according to the prior art would not allow the large skew angle $\lambda_i$ of the traversing chain section $6_{Ti}$ that occurs or is required during the inboard gearshift operation $S_i$, but would force the traversing chain section $6_{Ti}$ onto a more rectilinear path analogously to the outboard skew angle $\lambda_o$, which would lead to a premature gearshift onto the larger sprocket $S_1'$.

Conversely, the considerably longer traversing chain section $6_{To}$ during outboard gear-shifts $S_o$ in relation to inboard gearshifts $S_i$ leads, in the case of an unchanged skew angle $\lambda_o = \lambda_i$ of this traversing chain section $6_{To}$ and with an axially symmetrical chain-guiding pulley from the prior art, to a lesser displacement of the traversing chain section $6_{To}$ in a chain pulley axial direction or horizontally in relation to inboard gearshift operations $S_i$, and thus to a reduced gearshift action in relation to inboard gearshift operations $S_i$, and to a relatively late gearshift onto the smaller sprocket $S_3$, $S_3'$ (cf. FIG. 7).

The inboard skew angle $\lambda_i$ that corresponds to the outboard skew angle $\lambda_o$ in the case of known chain-guiding pulleys, and the resulting relatively great displacement of the relatively short traversing chain section $L_{Si}$ in the direction of the larger target sprocket $S_1$, $S_1'$, thus has the effect that, with known chain-guiding pulleys, the traversing chain section $L_{Si}$ rubs against the outboard-side outer surface $31_F$ (cf. FIG. 6) of the larger target sprocket $S_1$, $S_1'$ at an earlier point in time and/or with greater intensity, which can undesirably lead to a premature gearshift onto the larger sprocket $S_1$, $S_1'$ at positions on the larger sprocket $S_1$, $S_1'$ that are not intended for gear-shifts.

On the sprockets of multi-sprocket cassettes, there are commonly situated specially designed recesses in the form of so-called gearshift channels, and special riding-up teeth, at which, during inboard gearshift operations $S_o$, the chain 6 is intended to ride up from the smaller sprocket $S_2$, $S_2'$ onto the larger sprocket $S_1$, $S_1'$ along an exactly defined path, which runs in particular approximately tangentially between the two sprockets. In order to prevent gearshift errors, the chain 6 must thus however be slidingly deflected laterally along all other teeth of the larger sprocket $S_1$, $S_1'$ until the chain 6 reaches one of the gearshift channels or one of the riding-up teeth of the larger sprocket $S_1$, $S_1'$.

During inboard gearshift operations $S_i$, however, the lateral deflection of the chain 6 on teeth of the larger sprocket $S_1$, $S_1'$ that are not provided for upshifting becomes more difficult the larger the gear ratio step is, the smaller the chain gap $C_{Gi}$ is and thus the shorter the length $L_{Si}$ of the traversing chain section $6_{Ti}$ is at the start of the gearshift operation, and the more teeth are situated between the gearshift channels and/or riding-up teeth of the larger sprocket $S_1$, $S_1'$, which are distributed along the circumference of the larger sprocket $S_1$, $S_1'$.

A particular challenge with regard to the deflection of the chain 6 arises if, in particular in the case of sprocket cassettes with thick-thin teeth, the chain 6 is situated on an odd-numbered so-called transition sprocket 30 and must be shifted in a synchronized manner in a defined longitudinal orientation onto the next larger, even-numbered sprocket 31 which has thick-thin teeth $T_W$, $T_N$, such that the thin teeth $T_N$ of the larger sprocket 30 engage into inner link plate chain links IL and the thick teeth of the larger sprocket 31 engage into outer link plate chain links OL. Such a gearshift situation is known for example from paragraph [0085] in conjunction with FIG. 5 of DE102015016767A1, and is also illustrated in FIG. 5, which will be described below.

FIG. 5 shows two sprockets 30, 31 of a sprocket cassette 5 during an inboard gearshift operation $S_i$, wherein the smaller sprocket 30 is an odd-numbered transition sprocket with 21 teeth, and the larger sprocket 31 is an even-numbered sprocket with thick-thin teeth $T_W$, $T_N$. It is also possible to see an upper chain-guiding pulley 16 of a derailleur 4 (not illustrated), and a chain section $6_{Ti}$ traversing between the chain-guiding pulley 16 and the odd-numbered sprocket 30.

The chain 6 shown in FIG. 5 et seq. is a flat-top chain which has top-bottom asymmetry with regard to the installed state on a bicycle. The top-bottom asymmetry consists in that preferably all chain links, considered on the basis of the example of the load strand $6_L$ of the chain 6 (cf. FIG. 2), have a substantially flat or straight-running contour on the top side, whereas the chain links have a conventional, concavely curved contour on the bottom side. Such flat-top chains have the advantage in particular of having greater stability with unchanged or even improved running and gearshift characteristics, because the straight profile of the top side of the chain links leads to an enlargement of the cross-sectional area of the chain links.

Here, the tooth geometry of the chain-guiding pulley 16 according to the disclosure may be configured for a flat-top chain such as the chain 6 illustrated in FIG. 5 et seq. in order to achieve the desired different skew angle of the chain 6, as the traversing chain section $6_{Ti}$ runs off the chain-guiding pulley 16, in a manner dependent on whether a gearshift is being performed in an inboard direction (cf. FIG. 6) or in an outboard direction (cf. FIG. 7).

The tooth geometry of the chain-guiding pulley 16 may however also be configured for a conventional chain that does not have top-bottom asymmetry. It is also possible for a chain-guiding pulley 16 that is optimized for interacting with a flat-top chain to be used together with a conventional chain without top-bottom asymmetry.

In this case, too, there will be a different skew angle of the chain 6, as the traversing chain section $6_{Ti}$ runs off the chain-guiding pulley 16, during inboard gearshifts than during outboard gearshifts; however, depending on geometry and in particular depending on the radius of curvature of the upper delimitation of the chain links in relation to the load strand $6_L$ in FIG. 2, this difference will be different and possibly less or even greater than with the use of a flat-top chain.

It is therefore preferred to match the chain-guiding pulley 16 to the geometry of the chain 6 used in each case, or to mount the chain intended for use with the chain guide pulley 16, i.e., preferably a flat-top chain, on the bicycle.

In the case of the even-numbered larger sprocket 31, which has thick-thin teeth, as per FIG. 5, the thick teeth $T_W$, which owing to their greater thickness in an axial direction of the sprocket fit and can engage only into the link plate intermediate space of outer link plate chain links OL but not into the link plate intermediate space of inner link plate chain links IL, are denoted by black dots. The reference designations OL and IL are plotted in the figures directly on the respective chain links.

The smaller, odd-numbered transition sprocket 30 has only thin teeth $T_N$, because each tooth of the transition sprocket 30 engages alternately into a spacing between the inner link plates of the inner chain link IL and into a spacing between the outer link plates of the outer chain link OL during each rotation owing to the odd number of teeth of said transition sprocket. The engagement of the traversing chain section $6_T$ into the transition sprocket 30 in FIG. 5 leads, during the present rotation of the sprocket pair 30, 31, to an engagement of the outer link plate chain links OL into those teeth of the transition sprocket 30 which are respectively denoted by a circle.

At three uniformly spaced-apart points, between which in each case eight teeth are situated, the larger, even-numbered sprocket 31 has in each case one inboard gearshift channel $L_{C1}$, $L_{C2}$, $L_{C3}$ for a traversing chain section $6_{Ti}$ to ride up from the smaller, odd-numbered sprocket 30 onto the larger, even-numbered sprocket 31 during inboard gearshifts. The inboard gearshift channels $L_C$ comprise riding-up ramps $R_{C1}$, $R_{C2}$, $R_{C3}$, which in FIG. 5 are partially concealed by the traversing chain section $6_T$, but the design of which can also be seen for example in FIG. 13. The riding-up ramps $R_C$ are situated in the outboard side surface of the larger sprocket 31 and allow the initial axial displacement of the traversing chain section $6_T$ upon the initiation of the inboard gearshift operation $S_i$ by the derailleur 4 (cf. FIG. 3).

Furthermore, each of the three inboard gearshift channels $L_{C1}$, $L_{C2}$, $L_{C3}$ of the larger sprocket 31 has in each case one gearshift tooth or catching tooth $T_{C1}$-$T_{C3}$, which has in each case special bevels and chamfers with which the respective catching tooth $T_{C1}$-$T_{C3}$ engages into an outer link plate chain link of the traversing chain section $6_T$. The catching tooth $T_C$ is thus the first tooth of the larger sprocket 31 which engages into the chain link plate intermediate spaces of the traversing chain section $6_T$.

In the situation shown in FIG. 5, the traversing chain section $6_{Ti}$, which is situated at the bottom in the drawing, has just passed the inboard gearshift channel $L_{C1}$ with its catching tooth $T_{C1}$ (which in FIG. 5 is concealed by an outer link plate chain link OL of the traversing chain section $6_{Ti}$), and at the same moment the chain-guiding pulley 16 has been displaced in an inboard direction by the distance S (cf. FIG. 4) by the derailleur 4, whereby an inboard gearshift operation $S_i$ has been initiated. The gearshift channel $L_{C1}$ situated at the bottom in the drawing, with its riding-up ramp $R_{C1}$ and its catching tooth $T_{C1}$, has however just been missed in this case, as a result of which the traversing chain section $6_{Ti}$ now cannot ride up onto the larger sprocket 31 until the traversing chain section $6_{Ti}$ arrives at the next passing gearshift channel $L_C$ during the further rotation $D_W$ of the sprocket cassette 5.

The next gearshift channel $L_{C2}$ with its riding-up ramp $R_{C2}$ and the associated catching tooth $T_{C2}$ dually reaches the traversing chain section $6_{Ti}$ after one third of a rotation $D_W$ of the sprocket cassette 5, as indicated in FIG. 5 by the traversing chain section $6_{Ti}'$ being shown once again in a position rotationally offset by 120°. However, no gearshift operation can take place at the gearshift channel $L_{C2}$, and instead the traversing chain section $6_{Ti}'$ must initially continue to be deflected laterally in an outboard direction by the larger sprocket 31 (cf. FIG. 6). This is because, if the traversing chain section $6_{Ti}'$ were to ride up onto the larger sprocket 31 at this location as a result of engagement into the gearshift channel $L_{C2}$ at this location with its riding-up ramp $R_{C2}$ and with its catching tooth $T_{C2}$, then desynchronized running of the chain 6 on the even-numbered larger sprocket 31 would occur. This can be seen, in the region of the gearshift position or gearshift channel $L_{C2}$ situated at $6_{Ti}'$, from the fact that the inner link plate chain link IL would coincide there with the thick tooth $T_{C2}$ of the larger sprocket 31, and the outer link plate chain links OL would accordingly coincide with the thin teeth of the larger sprocket 31.

Desynchronized running of the chain 6 on an even-numbered sprocket 31 with thick-thin teeth $T_W$, $T_N$ is naturally undesirable, because the inner link plate chain links IL of the chain 6 would then ride up on the tooth tips of the thick teeth $T_W$, which could lead to an interruption of the transmission of torque from the chain 6 to the sprocket cassette 5, and thus to a possibly hazardous riding situation or to damage to the drivetrain 2.

The traversing chain section $6_{Ti}'$ of FIG. 5 therefore must not ride up onto the larger sprocket 31 at the gearshift channel $L_{C2}$ with its riding-up ramp $R_{C2}$ and its catching tooth $T_{C2}$, and instead the traversing chain section $6_{Ti}$ must continue to be slidingly deflected by the sprocket 31 on the outboard side surface $31_F$ (cf. the dotted line $31_F$ in FIG. 6) of the larger sprocket 31 until the third gearshift channel $L_{C3}$ with its riding-up ramp $R_{C3}$ and its catching tooth $T_{C3}$, at the top left in FIG. 5, is reached during further rotation $D_W$ of the sprocket cassette 5.

Thus, depending on the sprocket size, there are under some circumstances only a few suitable rotational angle positions of the cassette 5 available per rotation of the sprocket cassette 5 for correct gearshift operations, possibly only one suitable rotational angle position, or, as in the example in FIG. 5, two suitable rotational angle positions with their gearshift channels $L_{C1}$ or $L_{C3}$, at which the respective riding-up tooth $T_{C1}$ or $T_{C3}$ coincides with an outer link plate chain link OL of the chain 6.

Thus, in the case of a cassette with thick-thin teeth $T_W$, $T_N$, even if the larger, even-numbered sprocket 31 comprises a plurality of inboard gearshift channels $L_C$ with respectively associated riding-up tooth $T_C$, which owing to the alternating thick and thin teeth have in principle a spacing to one another of an even number of teeth, the chain 6, proceeding from an odd-numbered transition sprocket 30, can in the best case ride up onto the even-numbered larger sprocket only at every second riding-up tooth $T_C$, because it is only at every second riding-up tooth $T_C$ that the chain 6 running on an odd-numbered transition sprocket 30 arrives with an outer link plate link OL at the riding-up tooth $T_C$ in the intended manner.

In such a case, which corresponds to FIG. 5, the chain 6 must therefore be deflected on a particularly large number of teeth of the larger sprocket 31, specifically in the present case according to FIG. 5 on all teeth within the segment $31_S$ covering two thirds of the circumference of the larger sprocket 31, including the catching tooth $T_{C2}$ contained in said segment $31_S$, so as not to ride up onto the larger sprocket 31 at an undesired position $L_{C2}$, which can lead to rough gear-shift operations, increased load on the drivetrain and undesired generation of noise, to the point of slipping of the chain 6 on the sprocket cassette 5 and thus an impairment of riding safety.

FIG. 6 shows this process of the deflection of the chain section $6_{Ti}$ traversing from the odd-numbered transition sprocket or starting sprocket 30 onto the even-numbered larger sprocket 31 during an inboard gearshift operation $S_i$. It can be seen that those chain links which are situated on the left of the drawing, that is to say the inboard-side chain links, slide on the face-side surface $31_F$ of the larger sprocket 31 and are deflected by the latter, i.e., do not engage into the teeth of the larger sprocket 31. For this purpose, it is necessary for the traversing chain section $6_{Ti}$ to be able to assume the S-shaped profile $6_{TiC}$ indicated by a dashed line in FIG. 6 and to traverse from the chain-guiding pulley 16 to the sprocket cassette 5 at a relatively large skew angle $\lambda_i$ (cf. FIG. 4). If, instead, the traversing chain section $6_{Ti}$ were forced to run on a less curved, more rectilinear profile, then the traversing chain section $6_{Ti}$ could no longer be deflected by the teeth of the larger sprocket 31 along the entire circular segment $31_S$ of FIG. 5, but could rather ride up onto the larger sprocket 31 in an undesirably premature manner and at an incorrect location, and furthermore possibly in a desynchronized manner.

These relationships are of particular importance in the case of the presently considered derailleurs 4 with non-inclined or only slightly inclined gearshift parallelogram 11 as per FIGS. 1 to 3, because, in the case of such derailleurs, as described further above with reference to FIGS. 2 to 4, the chain-guiding pulley 16 is displaced only horizontally by the derailleur 4 at the start of the inboard gearshift operation $S_i$. By contrast, as described, the vertical displacement of the chain-guiding pulley 16 to restore the required chain gap $C_G$ takes place only after the chain 6 has changed over onto the larger sprocket $S_1$, $S_1'$, 30, for which reason the traversing chain section $6_{Ti}$ has a relatively short length $L_{Si}$ in the case of inboard gearshifts $S_i$, cf. FIGS. 2 to 4.

Under these conditions, with a chain-guiding pulley according to the prior art, the tooth geometry of which is substantially mirror-symmetrical with respect to a central plane $P_M$ of the chain-guiding pulley 16 (cf. FIG. 19), the deflection of the traversing chain section $6_{Ti}$ during in-board gearshift operations $S_i$, such as is required for a correct gearshift operation, cannot be ensured because chain-guiding pulleys according to the prior art exhibit equally strong chain-guiding characteristics during inboard gearshift operations $S_i$ and during outboard gearshift operations $S_o$ owing to their symmetry with respect to their central plane.

Referring to FIG. 6, this would mean that, with a chain-guiding pulley according to the prior art, which has a strong chain-guiding characteristic during inboard gearshift operations $S_i$, the traversing chain section $6_{Ti}$ would not be able to assume the required relatively strongly curved profile $6_{TiC}$ with the relatively large skew angle $\lambda_i$, and would thus have a tendency to ride up onto the larger sprocket 31 prematurely at rotational angle positions or gearshift channels $L_{C2}$ not intended for this.

Altogether, it is accordingly the case, in particular in the case of the derailleurs 4 in question with non-inclined or only slightly inclined shift parallelogram 11, and even more so in the case of the combination of such derailleurs 4 with sprocket cassettes 5 with thick-thin teeth $T_W$, $T_N$, that, during the inboard gearshift operation $S_i$, an increased skew angle $\lambda_i$ of the traversing chain section $6_{Ti}$, and for this purpose therefore a relatively weak axial chain-guiding characteristic of the chain-guiding pulley 16, is desirable in order that the traversing chain section $6_{Ti}$ does not ride up onto the larger sprocket $S_1$, $S_1'$, 30 at a tooth not intended for this, and is instead deflected as effectively as possible on all teeth that are not intended for riding up, cf. $31_S$ in FIG. 5.

At the same time, however, the chain-guiding pulley 16 should ensure that, during out-board gearshift operations $S_o$, owing to the greater length $L_{So}$ of the traversing chain section $6_{To}$ as described further above in particular with reference to FIGS. 3 and 4, cf. also FIG. 5, the traversing chain section $6_{To}$ is deflected with sufficiently great intensity that the traversing chain section $6_{To}$ can be captured by one of the descent teeth $T_D$ of the larger sprocket 31, can be deflected laterally in an outboard direction in the intended manner, and can thus be guided onto the smaller sprocket 30 at the intended gearshift position.

This situation is illustrated in FIG. 7. With regard to the desired relatively small skew angle $\lambda_o$, which is also realized in FIG. 7, of the traversing chain section $6_{To}$ in an outboard direction, which has a greater length $L_{So}$ in relation to the length $L_{Si}$ of the traversing chain section $6_{Ti}$ during inboard gearshift operations in the direction $S_i$ as per FIGS. 2 to 5, reference is made in particular also to FIG. 4, which shows, together with the associated part of the description, the derivation of the different skew angles $\lambda_i$ and $\lambda_o$.

The chain-guiding pulley 16 according to the present disclosure satisfies the above-described requirements for a strong lateral chain-guiding characteristic in a chain pulley axial direction during outboard gearshift operations $S_o$ in combination with a relatively weak lateral chain-guiding characteristic in the case of inboard gearshift operations $S_i$.

In the embodiment of the chain-guiding pulley 16 illustrated in the figures, this is achieved in that the teeth of the chain-guiding pulley 16 have an inboard-side guide region $A_{Gi}$ and an outboard-side guide region $A_{Go}$, wherein the inboard-side guide region $A_{Gi}$ has, in relation to the outboard-side guide region $A_{Go}$, a regionally reduced thickness dimension $T_T$ relative to a central plane $P_M$ of the chain-guiding pulley 16 (cf. FIG. 19). Such inboard-side guide regions $A_{Gi}$ and outboard-side guide regions $A_{Go}$ can already be seen in FIGS. 6 and 7.

It is thus clear from FIG. 6 that that part of the traversing chain section $6_{Ti}$ which is denoted by $L_{Si}$ can assume the required pronounced S-shaped profile $6_{TiC}$ with the larger skew angle $\lambda_i$ as described above, despite the chain-guiding pulley 16 having already been shifted horizontally in an inboard direction, primarily by virtue of the fact that the outer link plate chain link $OL_1$ is provided with weak lateral guidance by the inboard-side guide region $A_{Gi}$ of the thick tooth $T_{W1}$ of the chain-guiding pulley 16.

FIGS. 8 to 12 show the chain-guiding pulley 16, together with a chain section $6_{Ti}$ or $6_{To}$ respectively traversing between chain-guiding pulley 16 and sprocket cassette 5, once again in different views during an inboard gearshift operation (FIGS. 9 and 10) and during an outboard gearshift operation (FIGS. 11 and 12).

FIG. 8 illustrates the chain-guiding pulley 16 and a chain section $6_T$ traversing from the chain-guiding pulley 16 to the sprocket cassette 5 in a viewing direction directed to the chain-guiding pulley 16 from the outboard side. $D_W$ again denotes the direction of rotation of the chain-guiding pulley 16 during normal operation, that is to say during driving operation of a drivetrain 2 of FIG. 1 or 2. That tooth $T_{W1}$ of the chain-guiding pulley 16 that is marked by a dashed oval in FIGS. 8 to 12 is a thick tooth $T_W$ of the chain-guiding pulley 16, which is formed with X-Sync™ teeth, i.e., with alternating thick and thin teeth.

FIGS. 9 and 10 show a traversing chain section $6_{Ti}$ in the case of an inboard gearshift operation from a smaller sprocket 30 to a larger sprocket 31 from the two viewing directions A and B that can be seen in FIG. 8. FIGS. 11 and 12 correspondingly show a traversing chain section $6_{To}$ during an outboard gearshift operation from a larger sprocket 31 onto a smaller sprocket 30.

Similarly to FIG. 6, it can be seen in FIGS. 9 and 10 that, in the case of inboard gearshift operations $S_i$, the chain-guiding pulley 16 has a relatively weak axial chain-guiding characteristic, as is desired, and thus allows a relatively large skew angle $\lambda_i$ of the traversing chain section $6_{Ti}$, whereby the traversing chain section $6_{Ti}$ is prevented from prematurely riding up onto the larger sprocket 31.

Correspondingly, in FIGS. 11 and 12, similarly to FIG. 7, it can be seen that, in the case of outboard gearshift operations $S_o$, the chain-guiding pulley 16 has the desired relatively strong axial chain-guiding characteristic, and thus leads to a relatively small skew angle $\lambda_o$ of the traversing chain section $6_{Ti}$ during outboard gearshift operations $S_o$.

As shown in particular in FIGS. 9 and 11, this is again achieved in that the teeth of the chain-guiding pulley 16 have an inboard-side guide region $A_{Gi}$ and an outboard-side guide region $A_{Go}$, wherein the inboard-side guide region $A_{Gi}$ has, in relation to the outboard-side guide region $A_{Go}$, a regionally reduced thickness dimension $T_T$ (cf. FIG. 19) relative to a central plane $P_M$ of the chain-guiding pulley 16. In particular, the reduced thickness dimension of the inboard-side guide region $A_{Gi}$ allows the desired increased skew angle $\lambda_i$ during inboard gearshift operations, as shown in FIG. 6 and FIGS. 9 and 10.

The apparently different sizes of the respectively same skew angles $\lambda_i$, $\lambda_o$ in the illustrations of FIGS. 4 and 6 to 12 arise from the fact that the skew angles $\lambda_i$, $\lambda_o$ are seen in the figures from a different direction and perspective in each case.

Figure 14:
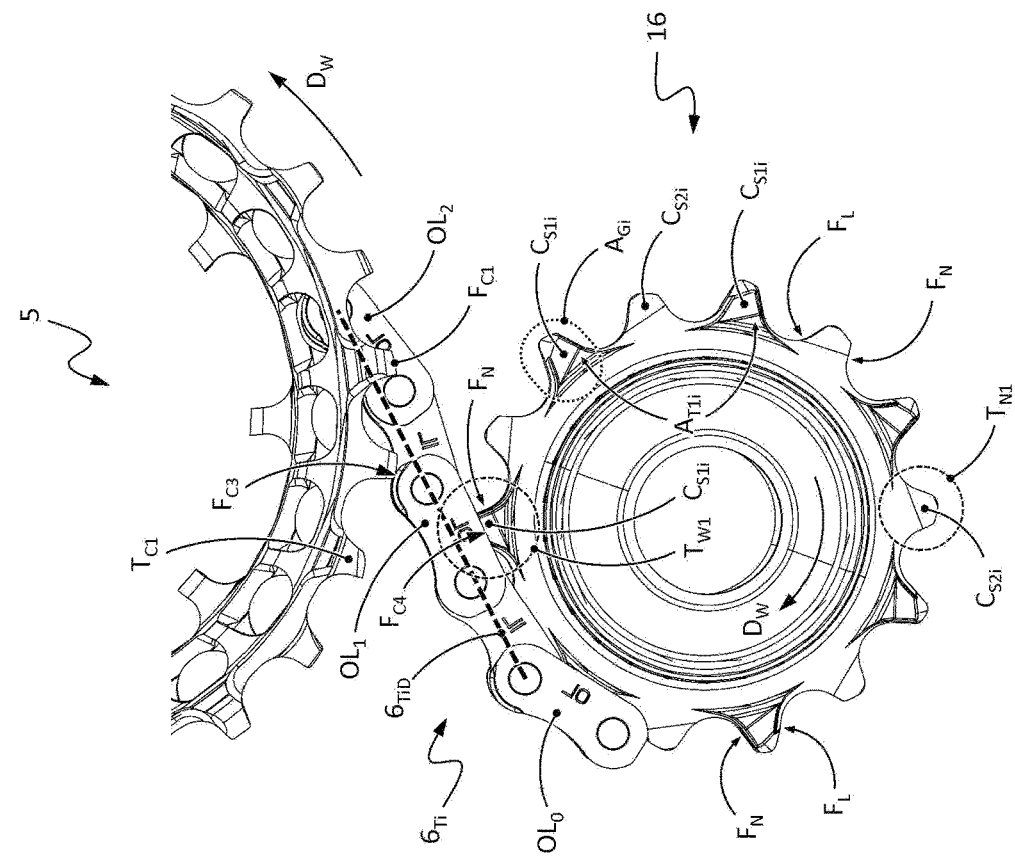
FIG. 14 shows the chain-guiding pulley, the chain section and the sprocket pair of FIG. 13 in a side view from an inboard side.
Figure 13:
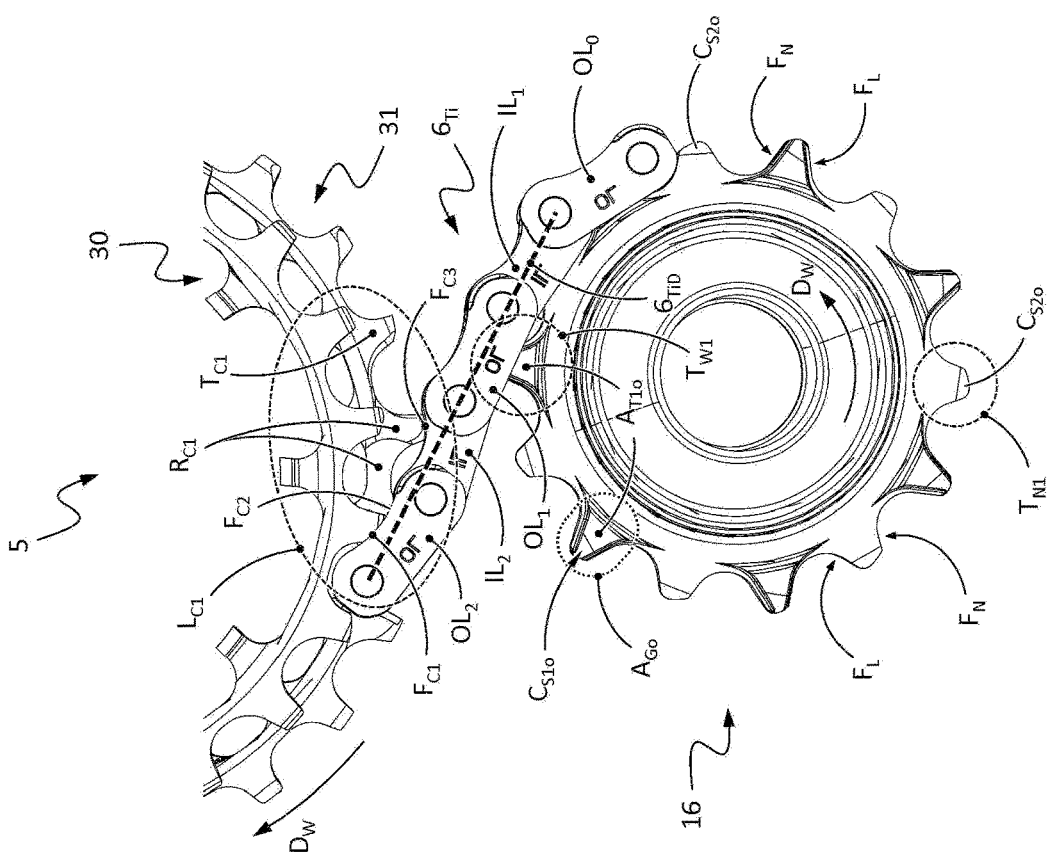
FIG. 13 shows the chain-guiding pulley of FIGS. 4 to 12 with a chain section similar to FIGS. 5 to 12 and with a sprocket pair of FIG. 5 in a side view from an outboard side.

FIG. 13 shows the situation as per FIG. 5 once again, in an enlarged detail illustration. It is again possible to see the two sprockets 30, 31 of a sprocket cassette 5, which are shown during an inboard gearshift operation. It is also possible to see a chain-guiding pulley 16 of a derailleur 4 (not illustrated) and the chain section $6_{Ti}$ traversing between the chain-guiding pulley 16 and the smaller sprocket 30. FIG. 14 shows the situation as per FIG. 13 from the rear side, i.e., seen from the inboard side.

The dashed oval $L_{C1}$ corresponds to that in FIG. 5 and marks the region of the inboard gearshift channel $L_{C1}$, situated there, of the larger sprocket 31, which inboard gearshift channel comprises in particular a riding-up ramp $R_{C1}$, formed by recesses in the face-side front surface of the sprocket 31, and an associated catching tooth $T_{C1}$. The catching tooth $T_{C1}$ is the first tooth of the larger sprocket 31 which engages into the link plate intermediate space of the chain links of the traversing chain section $6_{Ti}$ during the inboard gearshift operation $S_i$.

Since the chain-guiding pulley 16, traversing chain section $6_{Ti}$ and sprocket pair 30, 31 in FIGS. 13 and 14 are positioned in the situation during an inboard gearshift operation $S_i$, such as is also illustrated for example in FIG. 6, the fact that the chain-guiding pulley 16 has already been displaced horizontally into the plane of the larger sprocket 31 (cf. position $16_i$ in FIG. 4) by the derailleur 4 means that the chain links IL, OL are rubbing, laterally in the region of contact surfaces $F_{C1}$, $F_{C2}$, $F_{C3}$ between the chain link plates and the sprocket teeth, against the teeth of the sprockets 30, 31 (cf. also the sliding of the traversing chain section $6_{Ti}$ against the outboard-side outer surface $31_F$ of the larger sprocket 31 as per FIG. 6) and in the region of the contact surface $F_{C4}$ between the chain outer link plate OL, abutting there, and an inboard-side bevel $C_{S1i}$ of the thick tooth $T_{W1}$ of the chain-guiding pulley 16.

Owing to these instances of rubbing between the chain links IL, OL of the traversing chain section $6_{Ti}$ against the teeth of the sprocket pair 30 or against the teeth of the chain-guiding pulley 16, the traversing chain section $6_{Ti}$, at the moment shown in the illustrated example of an inboard gearshift operation, does not run exactly along the tangent $6_{TiD}$ between the chain-guiding pulley 16 and the smaller sprocket 30 but is deflected slightly in an S shape in relation to the tangent $6_{TiD}$ owing to these instances of rubbing and the resulting forces in a radial direction with respect to the chain-guiding pulley 16 or with respect to the sprocket pair 30, 31.

In the event of further rotation along the operating directions of rotation $D_W$ of chain-guiding pulley 16 and sprocket pair 30, 31, those edges which point upwards in the drawing in FIGS. 13 and 14, and those surfaces of the inboard-side chain link plates of the chain links $OL_1$, $11_2$ and $OL_2$ which point in an inboard direction, come into contact with the corresponding surfaces and bevels of the riding-up ramp $R_{C1}$, as a result of which the final riding-up of the traversing chain section $6_{Ti}$ onto the larger sprocket 31 occurs. Here, at the same time, the catching tooth $T_{C1}$ engages between the chain link plates of the outer link plate chain link $OL_1$. In the event of yet further rotation along the operating directions of rotation $D_W$ of chain-guiding pulley 16 and sprocket pair 30, 31, the traversing chain section $6_{Ti}$, or the chain 6 that subsequently runs onto the larger sprocket 31, then engages fully into the larger sprocket 30.

FIGS. 13 and 14 also again show the lateral chain-guiding characteristic of different strengths in a chain pulley axial direction $A_P$ (cf. FIGS. 9 and 11) of the chain-guiding pulley 16 in accordance with the disclosure. FIGS. 13 and 14 show an inboard gearshift operation, as is also shown by way of example in FIG. 6.

The lateral chain-guiding characteristic of the chain-guiding pulley 16 of different strengths at the inboard side and at the outboard side is attributable primarily to the different designs, on the inboard side and on the outboard side, of the guide regions $A_{Gi}$ (inboard side) and $A_{Go}$ (outboard side) in particular of the thick teeth $T_W$ of the chain-guiding pulley 16. As is also already indicated in FIGS. 9 and 11, the inboard-side guide region $A_{Gi}$ and outboard-side guide region $A_{Go}$ at least of the thick teeth $T_W$ of the chain-guiding pulley 16 at least in some areas have different thickness dimensions, in such a way that in particular the bevel surfaces $C_{S1i}$ (in-board side) and $C_{S1o}$ (outboard side) that are visible in FIG. 13 and FIG. 14 are of different size, or are recessed to different extents relative to the respective face-side tooth surface $A_{T1i}$ (inboard side) and $A_{T1o}$ (outboard side) of the thick tooth $T_W$.

Figure 16:
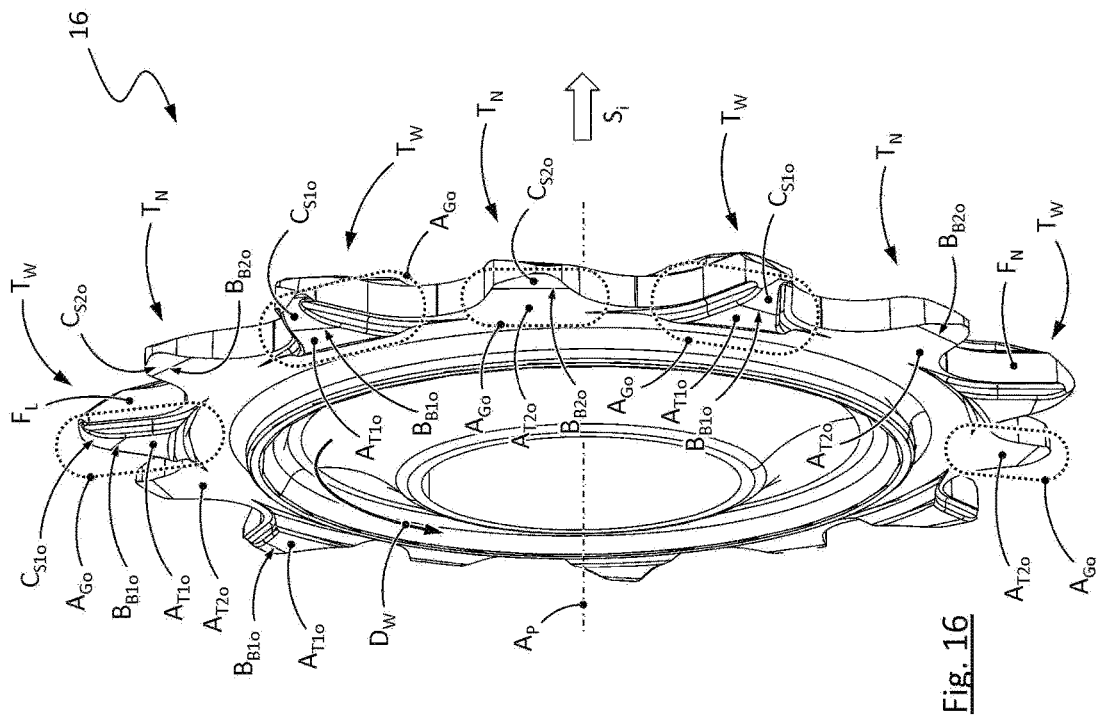
FIG. 16 shows the chain-guiding pulley of FIG. 15 in a perspective oblique view of the outboard side of the chain-guiding pulley from the front.
Figure 15:
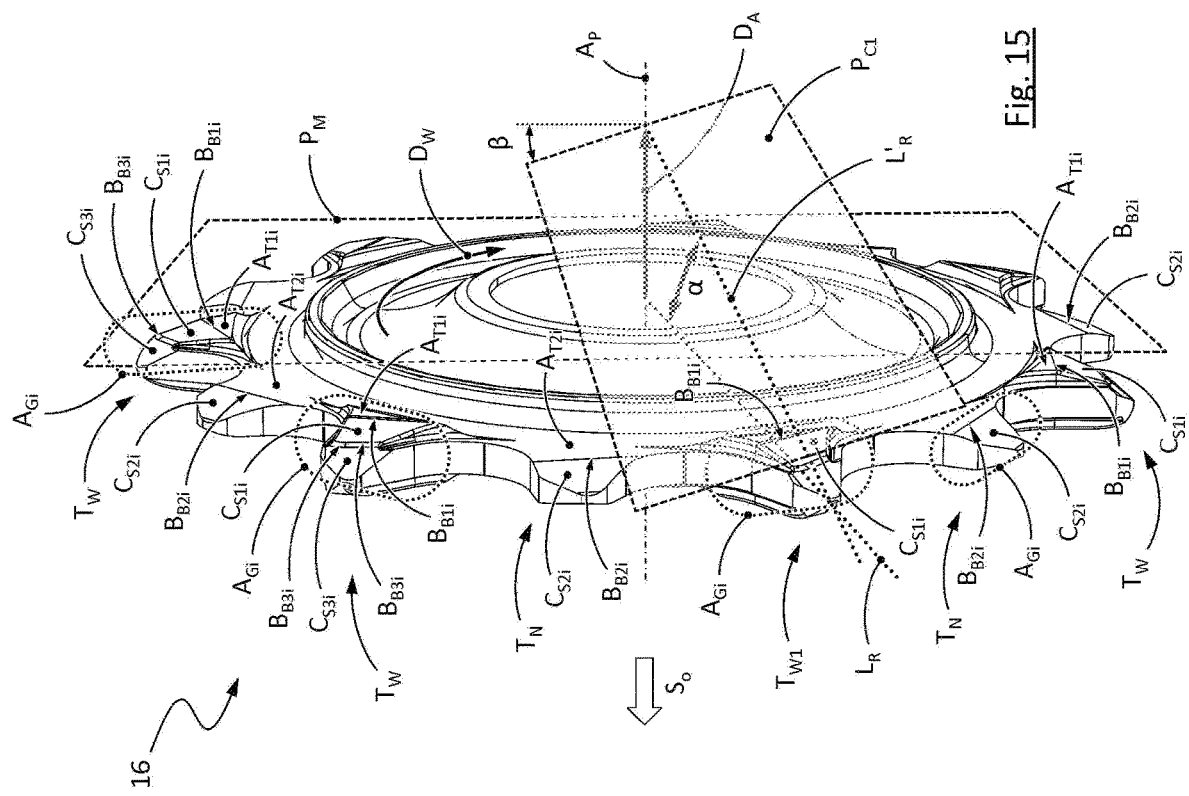
FIG. 15 shows the chain-guiding pulley of FIGS. 1 to 14 in a perspective oblique view of the inboard side of the chain-guiding pulley from the front.

As is also illustrated in FIGS. 15 and 16 and described in detail further below, the outboard-side bevel surfaces $C_{S1o}$, and to a considerably greater degree the inboard-side bevel surfaces $C_{S1i}$, are configured, in particular spatially inclined, such that the smaller thickness dimension, at the inboard side, of the thick teeth $T_W$, which is primarily responsible for the reduced chain-guiding characteristic in a chain pulley axial direction of the chain-guiding pulley 16, does not yet take effect at the tooth root at $A_{T1i}$ (inboard side) and $A_{T1o}$ (outboard side).

In other words, this means that the chain 6, for as long as this has not yet gradually departed, as traversing chain section $6_{Ti}$, from the chain-guiding pulley 16 but is still fully in engagement with the chain-guiding pulley 16, which in FIGS. 13 and 14 applies for example to the outer link plate chain link $OL_0$, is guided by the chain-guiding pulley 16 in the chain pulley axial direction $A_P$ (cf. FIGS. 9 and 11) with lateral chain-guiding characteristic of non-reduced, substantially equal strength both at the inboard side and at the outboard side. This is advantageous because, in this way, reliable guidance of the chain 6 on the chain pulley is ensured, and in particular, undesired lateral movements of the chain 6 on the chain-guiding pulley 16 and likewise undesired desynchronization of the chain 6 in the case of a chain-guiding pulley 16 with X-Sync™ teeth, that is to say with alternating thick teeth $T_W$ and thin teeth $T_N$, are reduced.

The reduced lateral chain-guiding characteristic in a chain pulley axial direction $A_P$ (cf. FIGS. 9 and 11) of the chain-guiding pulley 16 rather acts in the first instance on the traversing chain section $6_{Ti}$, i.e., when the outer link plate chain links OL gradually depart from the chain-guiding pulley 16 during inboard gearshift operations $S_i$. At the moment illustrated in FIGS. 13 and 14, this relates to the situation at the thick tooth $T_{W1}$. It can be seen in FIG. 14 how the inboard-side bevel surface $C_{S1i}$ of the thick tooth $T_{W1}$ imparts its reduced lateral chain-guiding characteristic by virtue of the fact that, and whilst, the outer link plate chain link OL1 is gradually departing, in a chain pulley radial direction, from the thick tooth $T_{W1}$.

A similar point in time during the inboard gearshift operation Si to that in FIGS. 13 and 14 is also illustrated in FIGS. 5 and 6. When viewed together with FIG. 5, it can also be seen in FIG. 6 how the inboard-side chain link plate of the outer link plate chain link OL1 departs in a chain pulley radial direction from the thick tooth $T_{W1}$, as a result of which it is made possible for the traversing chain section $6_{Ti}$ to deflect, correspondingly to the S-shaped profile $6_{TiC}$ shown in FIG. 6, in an outboard direction, i.e., to the right in the drawing, and thus avoid a premature upshift onto the larger sprocket 31.

It can also be seen in FIGS. 13 and 14 that the thin teeth $T_N$ of the chain-guiding pulley 16 are also designed such that an inboard-side guide region $C_{S2i}$ has, in relation to an outboard-side guide region $C_{S2o}$ of the respective thin tooth $T_{N1}$, an at least regionally reduced thickness dimension relative to a central plane $P_M$ (cf. FIG. 16) of the chain-guiding pulley 16, in such a way that the chain section $6_{Ti}$ running substantially tangentially off the chain-guiding pulley 16 can assume a greater skew angle in an outboard direction than in an inboard direction.

In the case of the thin teeth $T_N$, this is achieved in the illustrated exemplary embodiment of the chain-guiding pulley 16 in that the inboard-side oblique bevel surfaces $C_{S2i}$ are larger than the corresponding outboard-side bevel surfaces $C_{S2o}$ and are set back further in the direction of the central plane $P_M$ of the chain-guiding pulley 16. In this way, the inboard-side bevel surfaces $C_{S2i}$ lead, in relation to the outboard-side bevel surfaces $C_{S2o}$, to a thickness dimension $T_T$ (cf. FIG. 19) of the respective thin tooth $T_{N1}$ which is reduced in the region of said bevel surfaces. These relationships can likewise be seen in FIGS. 15, 16 and 18 and FIGS. 24 to 26.

These bevel surfaces $C_{S2i}$ and $C_{S2o}$ are also again arranged obliquely in space such that they reduce the thickness, respectively acting on the chain 6, of the respective thin tooth $T_N$ only when the respective inner link plate chain link IL gradually departs in a chain pulley radial direction from the thin tooth $T_N$ and thus becomes part of the chain section $6_T$ traversing from the chain-guiding pulley 16 onto the sprocket cassette 5.

The design of the inboard-side guide regions $A_{Gi}$, $C_{Si}$ and of the outboard-side guide regions $A_{Go}$, $C_{So}$ of the thick and thin teeth $T_W$ and $T_N$ of the embodiment for a chain-guiding pulley 16 as per FIGS. 4 to 23, in particular the spatial arrangement of the corresponding bevel surfaces, can be seen in detail from FIGS. 15 and 16.

FIG. 15 shows the chain-guiding pulley 16 as per FIGS. 4 to 23 in a perspective illustration obliquely from the front, in a view directed towards the inboard side, and FIG. 16 shows the chain-guiding pulley 16 as per FIGS. 4 to 23 in a perspective illustration obliquely from the front, in a view directed towards the outboard side.

Firstly, using the example of the thick tooth $T_{W1}$, it will be discussed how the inboard-side guide region $A_{Gi}$ (FIG. 15) of the thick tooth $T_{W1}$ is provided with the thickness dimension $T_T$ (cf. FIG. 19) which is at least in some areas reduced in relation to the outboard-side guide region $A_{Go}$ (FIG. 16) of the thick tooth $T_{W1}$ and which ensures the reduced chain-guiding characteristic of the thick teeth $T_W$ of the chain-guiding pulley 16 at the inboard side.

It can be seen that the inboard-side guide region $A_{Gi}$ and outboard-side guide region $A_{Go}$ of the thick tooth $T_{W1}$ are each configured as elevated thickened portions which are arranged in particular in the region of an inboard-side side surface $A_{T1i}$ and in the region of an outboard-side side surface $A_{T1o}$ of the tooth $T_{W1}$ respectively, or which respectively form said regions $A_{T1i}$, $A_{T1o}$.

It can furthermore be seen that the inboard-side guide region $A_{Gi}$ at least in some areas has, in relation to the outboard-side guide region $A_{Go}$, a reduced thickness dimension relative to an imaginary central plane $P_M$ of the chain-guiding pulley 16. In the illustrated exemplary embodiment of the chain-guiding pulley 16, this is achieved in that the inboard-side side surface $A_{T1i}$ of the thick tooth $T_{W1}$ is provided with a three-dimensionally bevelled bevel surface $C_{S1i}$. The bevel surface $C_{S1i}$ is arranged and oriented on the tooth $T_{W1}$ such that the bevel surface $C_{S1i}$ defines a bevel plane $P_{C1}$.

The bevel plane $P_{C1}$ is firstly arranged so as to be tilted by an angle α relative to the central plane $P_M$ of the chain-guiding pulley 16 along the axial direction $D_A$ of the chain-guiding pulley 16. As a result of this tilting α of the bevel plane $P_{C1}$, a radially inner delimiting edge $B_{B1i}$ of the bevel surface $C_{S1i}$ is defined, with which the bevel surface $C_{S1i}$ adjoins the inboard-side side surface $A_{T1i}$ of the tooth $T_{W1}$.

In the illustrated exemplary embodiment, in addition to the tilting α along the axial direction $D_A$, the bevel plane $P_{C1}$, which defines the bevel surface $C_{S1i}$, of the tooth $T_{W1}$ is also pivoted relative to the chain pulley central plane $P_M$ by an angle β about a chain pulley radial line $L_R$ that is assigned to the tooth $T_{W1}$. This further pivoting β has the effect that the radially inner delimiting edge $B_{B1i}$ of the bevel surface $C_{S1i}$ is provided with a profile which rises in a radially outward direction along an operating direction of rotation $D_W$ of the chain-guiding pulley 16, and that the tooth $T_{W1}$ has, at least in the region of the bevel surface $C_{S1i}$, a thickness $W_T$ which decreases from the tooth non-load flank $F_N$ towards the tooth load flank $F_L$, in this regard cf. FIGS. 17 to 19 and the associated description.

For the sake of a better illustration, the additional pivoting β is shown in FIG. 15 relative to the bevel plane $P_{C1}$, which is already tilted by the angle α, and thus relative to the straight line $L'_R$, which is likewise correspondingly tilted relative to the chain pulley radial line $L_R$. The same result, in particular the same situation of the bevel plane $P_{C1}$ is attained if this is first pivoted by the angle β about the chain pulley radial line $L_R$ and is subsequently tilted by the angle α along the axial direction $D_A$ of the chain-guiding pulley 16.

Similarly to the above-described arrangement and spatial positioning of the bevel surface $C_{S1i}$, in particular by tilting through an angle α along an axial direction $D_A$ of the chain-guiding pulley 16 and by additional pivoting through an angle β about a chain pulley radial line $L_R$, $L'_R$, assigned to the respective tooth T, relative to a chain pulley central plane $P_M$, further bevel surfaces are also defined on the teeth $T_W$ and $T_N$ in the embodiment of the chain-guiding pulley 16 in question.

This applies in particular to the inboard-side bevel surfaces $C_{S2i}$ with their radially inner delimiting edges $B_{B2i}$ with respect to the respective face-side tooth surfaces $A_{T2i}$ on the thin teeth $T_N$. The outboard-side bevel surfaces $C_{S1o}$ of the thick teeth $T_W$ with their radially inner delimiting edges $B_{B1o}$ with respect to the respective face-side tooth surfaces $A_{T1o}$ and the outboard-side bevel surfaces $C_{S2o}$ of the thin teeth $T_N$ with their radially inner delimiting edges $B_{B2o}$ with respect to the respective face-side tooth surfaces $A_{T2o}$ are also defined, positioned and three-dimensionally obliquely arranged in a manner analogous to that described above for the bevel surface $C_{S1i}$.

In the illustrated embodiment of the chain-guiding pulley 16, the additional inboard-side bevel surfaces $C_{S3i}$ of the thick teeth $T_W$ are furthermore also constructed or defined in an analogous manner.

Altogether, this means that the radially inner delimiting edges $B_{B1i}$, $B_{B2i}$, $B_{B3i}$, $B_{B1o}$, $B_{B2o}$ of all inclined bevel surfaces $C_{S1i}$, $C_{S2i}$, $C_{s3i}$, $C_{S1o}$, $C_{S2o}$ of the chain-guiding pulley 16 have a profile which rises in a radially outward direction along the operating direction of rotation $D_W$ of the chain-guiding pulley 16.

Figure 18:
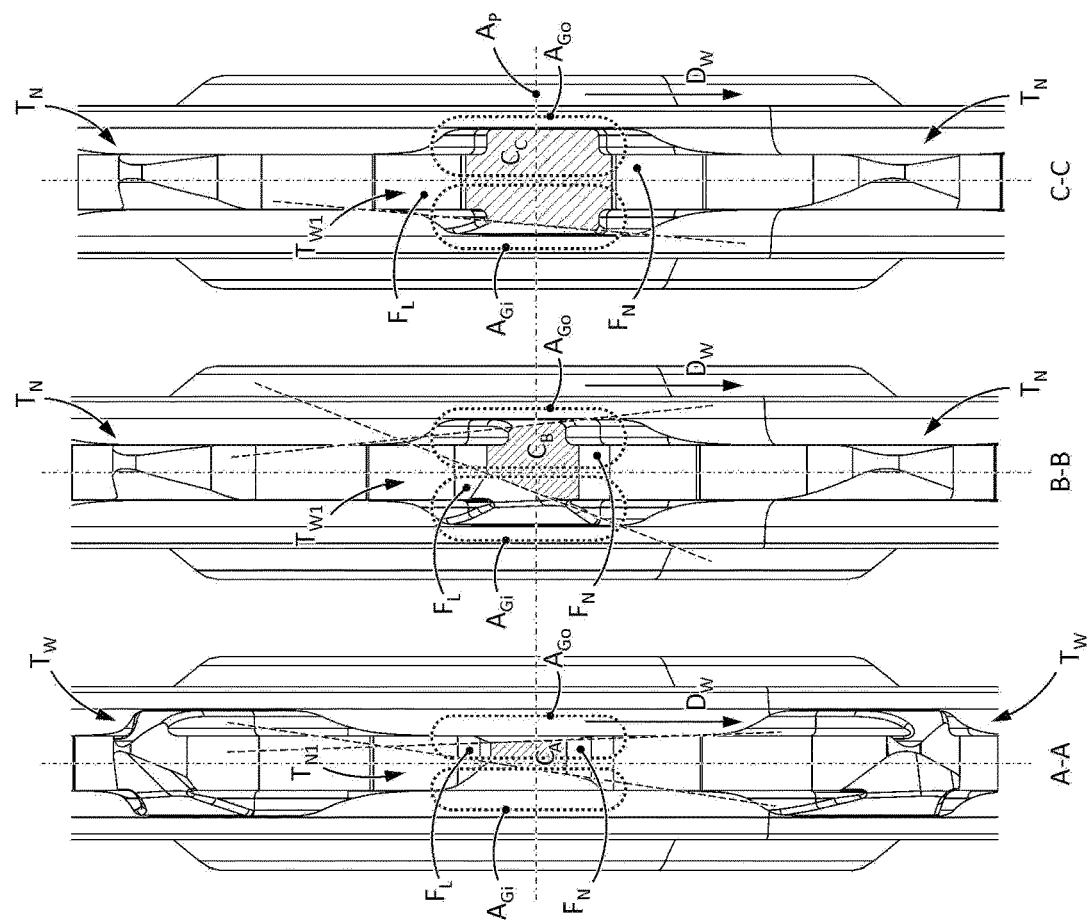
FIG. 18 shows the chain-guiding pulley of FIG. 17 in sectional illustrations in accordance with the section planes in FIG. 17.
Figure 17:
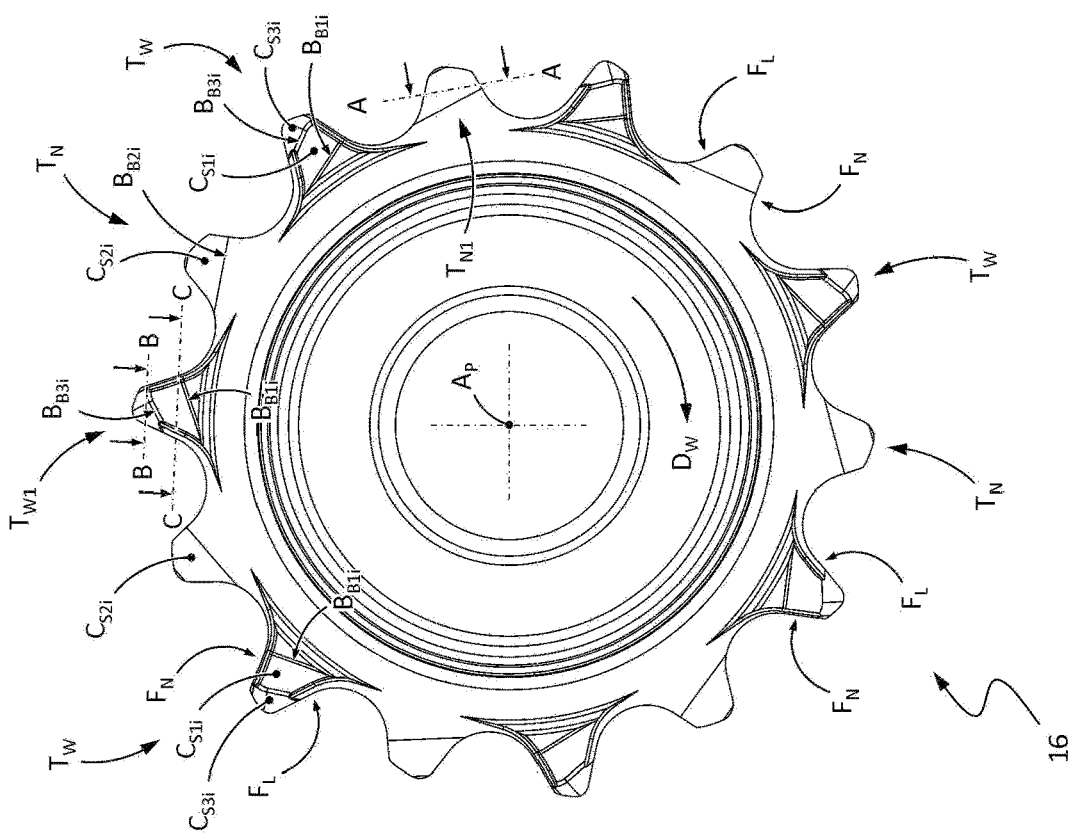
FIG. 17 shows the chain-guiding pulley of FIGS. 4 to 16 in a side view of the inboard side of the chain pulley with section planes for FIG. 18.

The radially outwardly rising profile of the inboard-side delimiting edges $B_{B1i}$, $B_{B2i}$, $B_{B3i}$ and the associated bevel surfaces $C_{S1i}$, $C_{S2i}$, $C_{s3i}$ of the chain-guiding pulley 16 can also be seen from FIG. 17, which shows the chain-guiding pulley 16 in a side view from the inboard side. Also indicated in FIG. 17 are the section planes A-A, B-B and C-C on which the section surfaces $C_A$, $C_B$, $C_C$ in FIG. 18 are based, and the load flanks $F_L$ and the non-load flanks $F_N$ of the thick teeth $T_W$ and of the thin teeth $T_N$ are designated. With regard to the distinction between load flank $F_L$ and non-load flank $F_N$ on a chain-guiding pulley 16, reference is also made to FIG. 5 and FIG. 13 and FIG. 14.

It can be seen in said figures that a load flank $F_L$ on a chain-guiding pulley 16 is defined as being that tooth flank which transmits the driving force from the chain 6 to the chain-guiding pulley 16 in an operating direction of rotation $D_W$ of the chain-guiding pulley 16. A non-load flank $F_N$ is accordingly defined as being the tooth flank situated opposite the load flank.

From the thick teeth $T_{W1}$ illustrated in section, and the thin tooth $T_{N1}$ likewise illustrated in section, in FIG. 18, it can be seen that the design of the inboard-side guide regions $A_{Gi}$ and outboard-side guide regions $A_{Go}$ of the thick teeth $T_W$ and of the thin teeth $T_N$ with their three-dimensionally inclined inboard-side and outboard-side bevel surfaces $C_{S1i}$, $C_{S2i}$, $C_{s3i}$, $C_{S1o}$, $C_{S2o}$, as described above on the basis of FIGS. 15 to 17, also has the effect that in particular the inboard-side guide regions $A_{Gi}$, and at least some areas also the outboard-side guide regions $A_{Go}$, have, at least in the region of the respective bevel surfaces $C_{S1i}$, $C_{S2i}$, $C_{s3i}$, $C_{S1o}$, $C_{S2o}$, a thickness which increases from the load flank $F_L$ of the tooth T in the direction of the non-load flank $F_N$ thereof.

This also promotes a situation in which, during the gearshift operation, the chain section $6_{Ti}$ or $6_{To}$ traversing from the chain-guiding pulley 16 onto the sprocket cassette 5 is guided as uniformly as possible, and with as little vibration as possible, as far as possible along the entire width of the teeth T in a circumferential direction of the chain-guiding pulley 16, because the traversing chain section $6_{Ti}$ or $6_{To}$ is in contact with the chain-guiding pulley 16 at a contact radius $R_T$ (cf. FIG. 22) of the chain-guiding pulley 16 which increases obliquely in the operating direction of rotation $D_W$, that is to say from the load flank $F_L$ towards the non-load flank $F_N$ of the teeth T of the chain-guiding pulley 16, as can be seen for example from FIGS. 5 to 7 and FIGS. 9 and 11.

This obliquely running contact of the chain section $6_{Ti}$ or $6_{To}$ departing from the chain-guiding pulley 16 is thus promoted, and made more uniform along the width of the teeth T in a circumferential direction of the chain-guiding pulley 16, by virtue of the thickness of the guide regions $A_{Gi}$, $A_{Go}$, and thus the chain-guiding thickness $W_T$ (cf. FIG. 19) of the teeth T of the chain-guiding pulley 16, decreasing from the non-load flank $F_N$ towards the load flank $F_L$ of the teeth T. This also makes it possible for lateral guidance both of the inner link plate chain links IL and of the outer link plate chain links OL of the traversing chain section $6_{Ti}$ or $6_{To}$ respectively to be made more uniform, with as constant as possible a skew angle $\lambda_i$ or $\lambda_o$ respectively.

FIGS. 19 to 23 show once again the major geometrical characteristics of the chain-guiding pulley 16 or of the inboard-side and outboard-side guide regions $A_{Gi}$ and $A_{Go}$, of the inboard-side and outboard-side bevel surfaces $C_{S1i}$, $C_{S2i}$, $C_{S3i}$, $C_{S1o}$ and $C_{S2o}$ and of the delimiting edges $B_{B1i}$, $B_{B2i}$, $B_{B3i}$, $B_{B1o}$ and $B_{B2o}$ thereof with respect to the respective face-side tooth surfaces $A_{T1i}$, $A_{T2i}$, $A_{T1o}$, $A_{T2o}$ of the thick and thin teeth $T_W$ and $T_N$.

In the enlarged details in FIGS. 22 and 23, it is possible again to see in particular the delimiting edges $B_{B1i}$, $B_{B2i}$, $B_{B3i}$, $B_{B1o}$ and $B_{B2o}$, which run obliquely in a circumferential direction of the chain-guiding pulley 16, of the inboard-side and outboard-side bevel surfaces $C_{S1i}$, $C_{S2i}$, $C_{S3i}$, $C_{S1o}$ and $C_{S2o}$, which delimiting edges arise owing to the bevel surfaces $C_{S1i}$, $C_{S2i}$, $C_{S3i}$, $C_{S1o}$ and $C_{S2o}$ being spatially tilted through angles $\alpha$ and $\beta$, as described further above with reference to FIG. 15.

As already discussed further above with reference to FIGS. 6 and 13 and 14, this tilted arrangement of the bevel surfaces $C_{S1i}$, $C_{S2i}$, $C_{S3i}$, $C_{S1o}$ and $C_{S2o}$ with the resulting oblique profile of the delimiting edges $B_{B1i}$, $B_{B2i}$, $B_{B3i}$, $B_{B1o}$ and $B_{B2o}$ has the effect that the chain links of the traversing chain section $6_T$, as the latter gradually departs from the chain-guiding pulley 16 (see for example chain link $OL_1$ in FIGS. 5 to 14), are provided with uniformly decreasing guidance in a chain pulley axial direction $A_P$.

Owing to the thickness dimension of the teeth $T_W$ and $T_N$ being reduced to a significantly greater degree in the region of the inboard-side guide regions $A_{Gi}$ than in the outboard-side guide regions $A_{Go}$, in other words owing to the face-side tooth surfaces $A_{T1i}$, $A_{T2i}$, $A_{T1o}$, $A_{T2o}$ of the thick and thin teeth $T_W$ and $T_N$ being bevelled to a greater degree at the inboard side, cf. FIGS. 15 and 16, this leads overall, as described, to a considerably weaker lateral chain-guiding characteristic of the chain-guiding pulley 16 in a chain pulley axial direction $A_P$ at the inboard side in relation to the outboard-side lateral chain-guiding characteristic of the chain-guiding pulley 16, cf. FIG. 4 and FIGS. 6 to 14 and the associated parts of the description.

However, as described, this chain-guiding characteristic which is reduced at the inboard side and to a lesser degree also at the outboard side acts only on those chain links of the chain section $6_{Ti}$ or $6_{To}$ traversing between the chain-guiding pulley 16 and the sprocket cassette 5 which have already partially departed from the chain-guiding pulley 16, cf. in particular the chain link $OL_1$ in FIGS. 5 to 14. By contrast, those chain links which are still running entirely on the chain-guiding pulley 16, cf. for example the chain links $OL_0$ and $IL_1$ in FIGS. 13 and 14, are provided with complete and non-reduced lateral guidance in a chain pulley axial direction $A_P$ both at the outboard side and at the inboard side.

The chain-guiding characteristic that is reduced also during outboard gearshift operations (cf. in particular FIG. 7), to a lesser degree than during inboard gearshift operations, on those chain links of the traversing chain section $6_{To}$ which have already partially departed from the chain-guiding pulley 16 (cf. chain link $OL_1$ in FIG. 7) has the effect that the slipping of the traversing chain section $6_{To}$ from the tooth tips of the chain-guiding pulley 16 during the outboard gearshift operation should take place duly as late as possible, which corresponds to a strong chain-guiding characteristic, but at the same time also uniformly and with little vibration, in order that any slipping of the traversing chain section $6_{To}$ from a rear-side recess on the toothing of the sprocket cassette 5 as a result of possible vibration is prevented. Furthermore, the chain-guiding characteristic that is reduced also on the outboard side, at least in the region of the tooth tips, has the effect that the desynchronization or slipping of the chain 6 from the chain-guiding pulley 16 during backward rotation of the drivetrain 2 is reduced or prevented.

This, too, is made possible by the tilted arrangement of the bevel surfaces $C_{S1i}$, $C_{S2i}$, $C_{S3i}$, $C_{S1o}$ and $C_{S2o}$ with the resulting oblique profile of the delimiting edges $B_{B1i}$, $B_{B2i}$, $B_{B3i}$, $B_{B1o}$ and $B_{B2o}$, because this has the effect that, on the thick and thin teeth $T_W$ and $T_N$, regions $A_{T1i}$, $A_{T2i}$, $A_{T1o}$, $A_{T2o}$ of the face-side tooth surfaces which have the complete, non-reduced thickness dimension are maintained in each case. This can be seen in particular from FIG. 19 viewed together with FIGS. 22 and 23. In FIG. 19, taking into consideration FIG. 22, it can be seen that in particular the thick teeth $T_W$ have a reduced thickness dimension $T_T$ in an inboard-side surface region $C_{S1i}$ outside a transition radius $R_T$, whereas the inboard-side thickness dimension $T_T$ of the thick teeth $T_W$ is not reduced within the transition radius $R_T$, at least in the surface region $A_{T1i}$.

This also applies analogously but to a lesser degree to the inboard-side surface region $C_{S2i}$ of the thin teeth $T_N$, and also to a yet further reduced degree to the outboard-side surface regions $C_{S1o}$ of the thick teeth $T_W$ and to the outboard-side surface regions $C_{S2o}$ of the thin teeth $T_N$. In all of these cases, the guide regions $A_{Gi}$ and $A_{Go}$ of the teeth $T_W$ and $T_N$ each have their complete thickness dimension $T_T$, as far as those chain links which are still running entirely on the chain-guiding pulley 16 are concerned (cf. for example chain links $OL_0$ and $IL_1$ in FIGS. 13 and 14), whereas the guide regions $A_{Gi}$ and $A_{Go}$ of the teeth $T_W$ and $T_N$ have a regionally reduced thickness dimension $T_T$ predominantly at the inboard side in the surface regions $C_{S1i}$ and $C_{S2i}$, but to a lesser degree also at the outboard side in the surface regions $C_{S1o}$ and $C_{S2o}$, as far as those chain links which have already partially departed from the chain-guiding pulley 16 are concerned (cf. for example chain link $OL_1$ in FIGS. 5 to 14).

In this way, the effective tooth thickness $W_T$ as per FIG. 19 in particular of the thick teeth $T_W$, which effects the synchronization of the chain 6 on the chain-guiding pulley 16, can be unchanged despite the reduced chain-guiding characteristic of the chain-guiding pulley 16 (cf. FIGS. 6 to 12) in particular in an inboard direction $S_i$. The greater the radius $R_T$ at which the critical effective tooth thickness is present, that is to say at which the tooth thickness $W_T$ of the thick teeth $T_W$ becomes greater than the internal width of the inner link plate chain links, the more effectively the chain 6 is synchronized on the chain-guiding pulley 16, and the less sensitive the synchronization is to wear-induced changes of the tooth shape or to a small angle of wrap of the chain 6 around the chain-guiding pulley 16, cf. the statements made regarding the angle of wrap in the introductory part of the description and the corresponding illustration in FIG. 2.

The tilted arrangement of the bevel surfaces $C_{S1i}$, $C_{S2i}$ and $C_{S3i}$, in particular the spatial inclination thereof with the resulting oblique profile of the delimiting edges $B_{B1i}$, $B_{B2i}$ and $B_{B3i}$, which spatial inclination follows the chain run-off line $6_{TiD}$ (cf. FIG. 14), has the effect that the traversing section of the chain $6_{Ti}$, in particular whilst the latter awaits an inboard gearshift channel (cf. FIGS. 5 and 6 and the associated description), can thus simultaneously take place as uniformly as possible and with the least possible vibration, and the effective radius $R_T$ for the synchronization of the thick-thin teeth $T_W$, $T_N$ of the chain-guiding pulley 6 with the chain 6 can be as large as possible.

Owing to the non-reduced strong chain-guiding characteristic of the thick-thin teeth $T_W$, $T_N$ of the chain-guiding pulley 16 according to the disclosure for those chain links which are still running entirely on the chain-guiding pulley, the chain 6 can thus still be guided and synchronized effectively even in the case of a relatively small angle of wrap around the chain-guiding pulley 16. The chain-guiding pulley 16 can thus for example also be provided with longer teeth, and thus even better chain-guiding characteristics, than would be possible in the case of a chain-guiding pulley according to the prior art, that is to say without the axially asymmetrical design of the teeth T according to the disclosure, because in the case of the chain-guiding pulley 16 according to the disclosure, the chain 6 is forced less intensely onto the respectively larger sprocket during inboard gearshift operations $S_i$ (cf. FIGS. 5 and 6 and the associated description).

In FIG. 22, it is furthermore possible to see the flank angles $\gamma_{L1}$, $\gamma_{L2}$ of the load flanks $F_{L1}$, $F_{L2}$ and the flank angles $\gamma_{N1}$, $\gamma_{N2}$ of the non-load flanks $F_{N1}$, $F_{N2}$ of the thin teeth $T_N$ and of the thick teeth $T_W$. In the embodiment of the chain pulley 16 in question, the flank angles $\gamma_{L1}$, $\gamma_{L2}$ of the load flanks $F_{L1}$, $F_{L2}$ of the teeth $T_N$, $T_W$ are in each case shallower than the flank angles $\gamma_{N1}$, $\gamma_{N2}$ of the non-load flanks $F_{N1}$, $F_{N2}$. Furthermore, the two flank angles $\gamma_{L1}$, $\gamma_{N1}$ of the thin teeth $T_N$ are in each case shallower than the corresponding two flank angles $\gamma_{L2}$, $\gamma_{N2}$ of the thick teeth $T_W$. Preferred values for the flank angles of the thin teeth $T_N$ and of the thick teeth $T_W$ respectively are $\gamma_{L1}=24.77°$ and $\gamma_{N1}=24.20°$, and $\gamma_{L2}=23.88°$ and $\gamma_{N2}=23.34°$, respectively. The load flank angle $\gamma_{L1}$ of the thin teeth $T_N$ is shallower than the load flank angle $\gamma_{L2}$ of the thick teeth $T_W$, because the thin teeth $T_N$ do not contribute to the synchronization but, in the event of possible desynchronization, merely have to be overcome by the chain 6 in order to restore the desired synchronization.

It is also possible in FIG. 22 to see regions $A_{S1}$, $A_{S2}$ around the tooth tips of the thick teeth $T_W$ and of the thin teeth $T_N$. It can be seen that the tooth tips of the teeth $T_W$, $T_N$ each have, in the regions $A_{S1}$, $A_{S2}$, an inclination $\varepsilon_1$, $\varepsilon_2$ that predominantly slopes downwards towards the respective non-load flank $F_{N1}$, $F_{N2}$ of the respective tooth $T_N$, $T_W$.

The undesired desynchronization of the chain 6 on a chain-guiding pulley 16 with thick-thin teeth $T_W$, $T_N$ occurs more commonly, or predominantly, during backpedalling. To prevent or reduce this, the flank angles $\gamma_{N1}$, $\gamma_{N2}$ of the non-load flanks $F_{N1}$, $F_{N2}$ (which become load flanks during backpedalling) are in each case steeper than the flank angles $\gamma_{L1}$, $\gamma_{L2}$ of the load flanks $F_{L1}$, $F_{L2}$ of the teeth $T_N$ and $T_W$.

The regions $A_{S1}$, $A_{S2}$ around the tooth tips of the teeth $T_W$, $T_N$, which each slope downwards towards the non-load flank $F_{N1}$, $F_{N2}$, serve the same purpose. Said regions also have the effect that undesired desynchronization of the chain 6 on the chain-guiding pulley 16 is reduced, and that, in the event of desynchronization, the chain 6 running on the chain-guiding pulley 16 is rapidly brought back into synchronous running on the chain-guiding pulley 16 again.

In particular, the tooth tip regions $A_{S1}$, $A_{S2}$ that slope downwards towards the non-load flank $F_{N1}$, $F_{N2}$ have the effect that a possibly desynchronized chain 6, which thus rides up radially outwardly onto the tooth flanks or tooth tips of the chain-guiding pulley 16, generates a relative torque between the chain 6 and the chain-guiding pulley 16, which relative torque has the effect that the chain-guiding pulley 16 rotates relative to the chain 6 until the chain 6 moves into synchronized engagement with the chain-guiding pulley 16 again and stabilizes there.

In FIG. 22, it is also the case that the spacing $D_D$ in a circumferential direction between the tooth pitch of the teeth $T_W$ and $T_N$ is as short as possible. This conversely means that the respective tooth widths of the teeth $T_W$ and $T_N$ of the chain-guiding pulley 16 in a circumferential direction are selected to be as long as possible. This, too, together with relatively short thin teeth $T_N$, which are heavily rounded in the transition region between tooth tip and load flank, and together with the tooth tips on the thick and thin teeth $T_W$ and $T_N$ which slope downwards towards the non-load flank $F_N$, promotes the synchronization of the chain 6.

Altogether, the synchronization of the chain 6 on the chain-guiding pulley 16 is thus improved, such that, in the event of possible desynchronization, the chain 6 is synchronized again automatically and as quickly as possible simply as a result of continuation of the running of the chain in the operating direction of rotation $D_W$, without the need for the user to perform specific actions, such as backpedalling until resynchronization is achieved. The non-synchronous running of the chain 6 on the chain-guiding pulley 16, and the automatic resynchronization, are scarcely perceptible to the user during this short phase.

Figure 25:
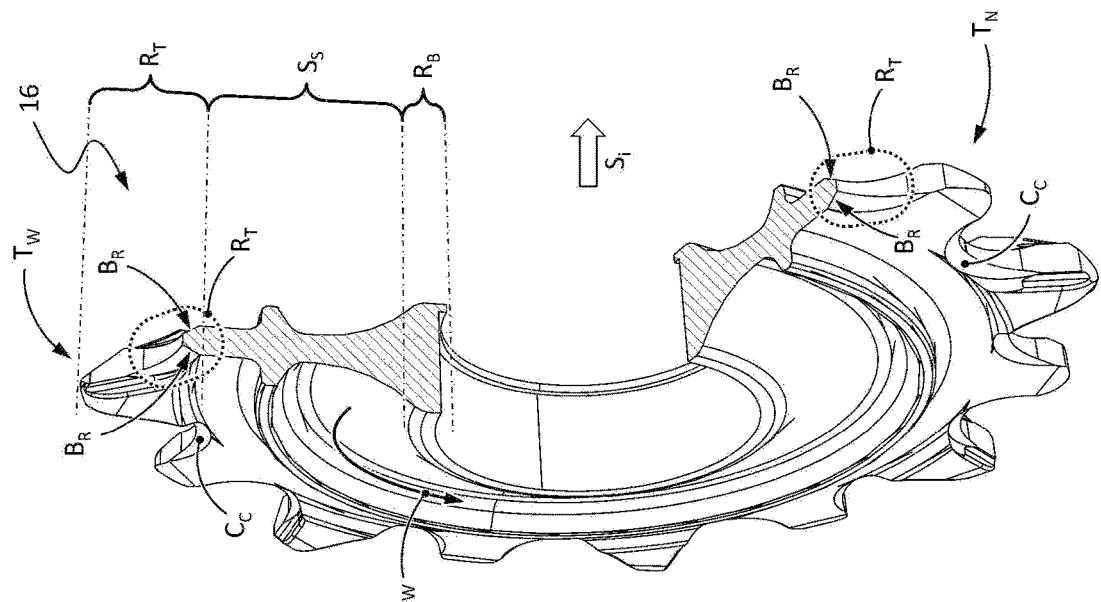
FIG. 25 shows the chain-guiding pulley of FIG. 24 in a partially sectional, perspective oblique view, corresponding to FIG. 16, of the outboard side of the chain-guiding pulley from the front.
Figure 26:
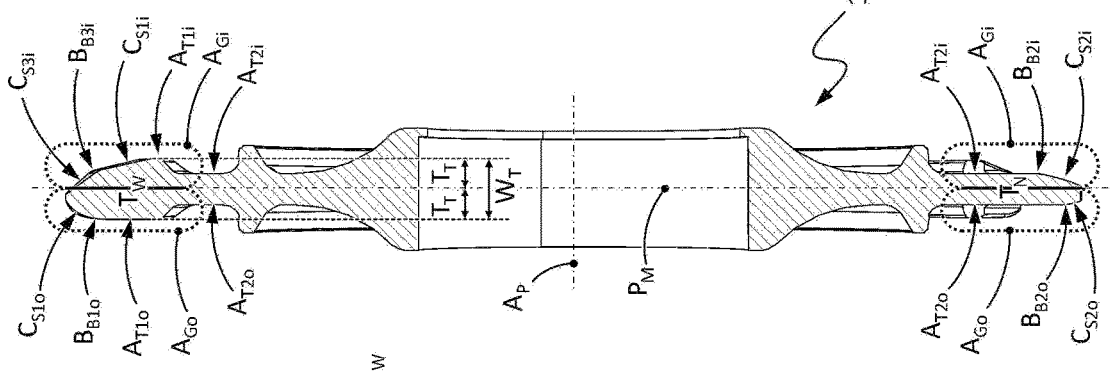
FIG. 26 shows the chain-guiding pulley of FIGS. 24 and 25 in a longitudinal section through the tooth tips.
Figure 24:
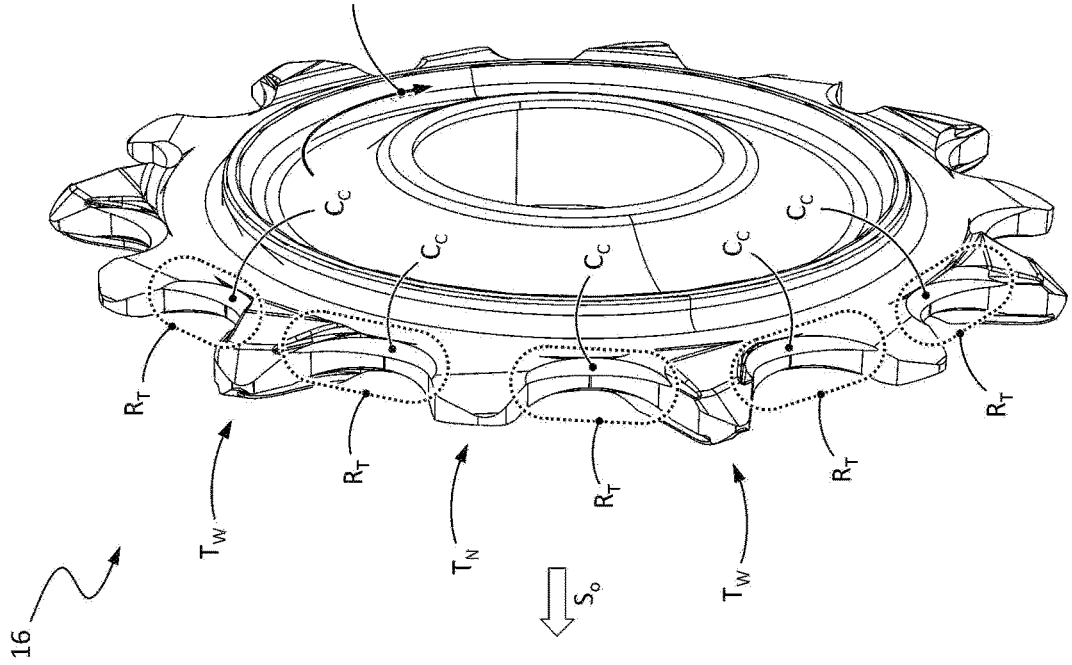
FIG. 24 shows another embodiment of a chain-guiding pulley in a perspective oblique view, corresponding to FIG. 15, of the inboard side of the chain-guiding pulley from the front.

FIGS. 24 to 26 show a further embodiment of a chain-guiding pulley 16. The embodiment of FIGS. 24 to 26 corresponds, in terms of practically all details of the toothing, in particular insofar as these are designed differently on the inboard side and on the outboard side in accordance with the disclosure, to the embodiment of FIGS. 4 to 23.

The embodiment of FIGS. 24 to 26 differs from the abovementioned embodiment merely in that, in the embodiment of FIGS. 24 to 26, a bevel $C_C$ is formed in the region of the tooth transition or tooth base $R_T$ between some, preferably all teeth $T_W$, $T_N$ both on the outboard side $S_o$ and on the inboard side $S_i$. By means of the bevel $C_C$, a self-cleaning capability of the chain-guiding pulley 16 can be achieved or improved in that undesired deposits of dirt, or in particular of ice during operation in winter, in the region of the tooth base $R_T$ are reduced or prevented by virtue of the tooth base $R_T$ being narrowed, and thus approximated to the form of a cutting edge, owing to the bevels $C_C$.

This can be seen in particular in the sectional illustration of FIG. 25, which also shows that the bevels $C_C$ formed both on the inboard side $S_i$ and on the outboard side $S_o$ lead to a corresponding bilateral chamfering $B_R$ in the region of the tooth base $R_T$ between the teeth $T_W$, $T_N$.

Also shown in FIG. 25 are the three regions of the chain-guiding pulley 16 that are relevant for the present disclosure, namely the bearing region $R_E$ for receiving a bearing arrangement such as a ball bearing, the tooth region $R_T$ with the teeth $T_W$, $T_N$ formed thereon for engaging the chain 6, and a support structure $S_S$ connecting the bearing region $R_B$ and the tooth region $R_T$.

FIG. 26 shows the chain-guiding pulley 16 of FIGS. 24 and 25 in a further sectional illustration. Here, the section surface runs through the axis $A_P$ of the chain-guiding pulley 16 and intersects a thick tooth $T_W$ in the upper region of the drawing and intersects a thin tooth $T_N$ in the lower region of the drawing. Similarly to FIG. 19, it is also possible in FIG. 26 to see the asymmetry of the toothing of the chain-guiding pulley 16 between the inboard-side guide regions $A_{GI}$ and the outboard-side guide regions $A_{GO}$. If the embodiment of the chain-guiding pulley 16 of FIGS. 4 to 23 were sectioned in the manner shown in FIG. 26, the result would be the same sectional image as in FIG. 26. In other words, this means that the illustration in FIG. 26 applies to both embodiments of the chain-guiding pulley, both according to FIGS. 4 to 23 and according to FIGS. 24 to 26.

With regard to the description of the surfaces $C_{S1o}$, $C_{S2o}$, $C_{S1i}$, $C_{S2i}$, $C_{S3i}$ and bevels $B_{B1o}$, $B_{B2o}$, $B_{B1i}$, $B_{B2i}$, $B_{B3i}$ of the toothing in the inboard-side guide regions $A_{GI}$ and the outboard-side guide regions $A_{GO}$ that can be seen in FIG. 26, reference is made to the description relating in particular to FIGS. 15 and 16 further above.

The chain-guiding pulley 16 according to the disclosure may furthermore also be used as a chain-tensioning pulley 15 (cf. FIG. 2) or in other regions of a bicycle drivetrain, in particular in the vicinity of the pedal-crank bearing $B_B$ (cf. FIGS. 1 and 2) as a so-called idler pulley. Idler pulleys are used on bicycles, in particular on mountain bikes with a rear-end structure suspension arrangement, in order to impart a particular desired profile to the load strand of the chain in the vicinity of the pedal-crank bearing or in the vicinity of the articulation point of the rear-end structure suspension arrangement, or in order to guide the return strand of the chain more reliably or closer to the rear-end structure strut, and to thus prevent the chain from impacting or jumping off.

In these cases, too, a guiding action of the chain-tensioning pulley 15 or of the idler pulley with different strengths in an outboard direction $S_o$ and an inboard direction $S_i$ can be desirable, which can be realized by means of a chain-guiding pulley 16 according to the present disclosure.

If used as an idler pulley in the load strand of the chain 6, the chain-guiding pulley 16 is in this case preferably formed from metal, whereas an idler pulley in the return strand of the chain 6 is preferably formed from plastic, similarly to the normal situation in the case of use in the bicycle derailleur 4 as described further above.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

What is claimed is:

1. A chain-guiding pulley for a drive train with a chain, a multiple sprocket assembly and a rear derailleur, the chain-guiding pulley comprising:

a bearing region rotatable about an axis of rotation;

a tooth region with teeth formed thereon for engaging into the chain; and a supporting structure that connects the bearing region and the tooth region, wherein, on at least one tooth, on each of the inboard and outboard side surfaces thereof, guide regions are formed for lateral guidance of the chain substantially parallel to the axis of rotation, wherein at least one guide region on the inboard side surface, compared to at least one guide region on the outboard side surface, of the least one tooth has a reduced thickness in at least some areas relative to a central plane of the chain-guiding pulley such that a chain section running substantially tangentially off the chain-guiding pulley has a greater skew angle in an outboard direction than in an inboard direction.

2. The chain-guiding pulley of claim 1, wherein the at least one guide region comprises an elevated thickened portion which is arranged in the region of an inboard side surface or of an outboard side surface of the at least one tooth.

3. The chain-guiding pulley of claim 1, wherein the at least one guide region of the at least one tooth, at least in some areas, has a thickness that decreases with increasing distance to the axis of rotation.

4. The chain-guiding pulley of claim 1, wherein at least one region of decreasing thickness of the at least one guide region of the at least one tooth is configured as a bevel surface which defines a bevel plane which is arranged so as to be tilted by an angle relative to a chain-guiding pulley central plane along an axial direction such that a radially inner delimiting edge of the bevel surface relative to a side surface of the at least one tooth is defined as a result of the tilting.

5. The chain-guiding pulley of claim 4, wherein the at least one bevel plane and thus the at least one bevel surface of the at least one tooth is pivoted by an angle relative to the chain pulley central plane about a chain pulley radial line that is assigned to the at least one tooth in such a way that the radially inner delimiting edge of the bevel surface has a profile that rises in a radially outward direction along an operating direction of rotation of the chain-guiding pulley, and/or in such a way that the at least one guide region has, at least in the region of the bevel surface, a thickness that increases from a load flank of the tooth towards a non-load flank thereof.

6. The chain-guiding pulley of claim 1, wherein a flank angle of the load flank of the at least one tooth is shallower than a flank angle of the non-load flank of the at least one tooth.

7. The chain-guiding pulley of claim 1, wherein a region around the tooth tip of the at least one tooth has an inclination predominantly towards the non-load flank of the tooth.

8. The chain-guiding pulley of claim 1, wherein the chain-guiding pulley has an even-numbered of plurality of teeth which are assigned, in alternating fashion in a circumferential direction, to in each case one first or one second tooth group, wherein the teeth of the first tooth group are narrow teeth, which are narrower than a link plate intermediate space of an inner chain link and wherein the second tooth group comprises at least one wide tooth, which is wider than the link plate intermediate space of the inner link plate, such that the at least one wide tooth can protrude fully only into a link plate intermediate space of an outer link plate chain link but not into the link plate intermediate space of the inner link plate chain link.

9. The chain-guiding pulley of claim 8, wherein at least one tooth of the first tooth group has a reduced tooth height in a radial direction in relation to at least one tooth of the second tooth group.

10. The chain-guiding pulley of claim 8, wherein one or both flank angles of at least one tooth of the first tooth group is shallower than the corresponding flank angle of at least one tooth of the second tooth group.

11. A rear bicycle derailleur comprising:

a base element connectable to a bicycle rear-end structure frame;

a gearshift element movable relative to the base element by a pivot arrangement; and a chain-guiding device pivotably connected to the gearshift element and includes an upper chain-guiding pulley and a lower chain-tensioning pulley, the upper chain-guiding pulley comprising:

a bearing region rotatable about an axis of rotation, a tooth region with teeth formed thereon for engaging into the chain, and a supporting structure that connects the bearing region and the tooth region, wherein, on at least one tooth, on each of the inboard and outboard side surfaces thereof, there are formed guide regions for lateral guidance of the chain substantially parallel to the axis of rotation, wherein at least one guide region on the inboard side surface, compared to at least one guide region on the outboard side surface, of the least one tooth has a reduced thickness in at least some areas relative to a central plane of the chain-guiding pulley such that a chain section running substantially tangentially off the chain-guiding pulley can assume a greater skew angle in an outboard direction than in an inboard direction.

12. The rear bicycle derailleur of claim 11, wherein the at least one guide region comprises an elevated thickened portion which is arranged in the region of an inboard side surface or of an outboard side surface of the at least one tooth.

13. The rear bicycle derailleur of claim 11, wherein the at least one guide region of the at least one tooth, at least in some areas, has a thickness that decreases with increasing distance to the axis of rotation.

14. The rear bicycle derailleur of claim 11, wherein at least one region of decreasing thickness of the at least one guide region of the at least one tooth is configured as a bevel surface which defines a bevel plane which is arranged so as to be tilted by an angle relative to a chain-guiding pulley central plane along an axial direction such that a radially inner delimiting edge of the bevel surface relative to a side surface of the at least one tooth is defined as a result of the tilting.

15. The rear bicycle derailleur of claim 14, wherein the at least one bevel plane and thus the at least one bevel surface of the at least one tooth is pivoted by an angle relative to the chain pulley central plane about a chain pulley radial line that is assigned to the at least one tooth in such a way that the radially inner delimiting edge of the bevel surface has a profile that rises in a radially outward direction along an operating direction of rotation of the chain-guiding pulley, and/or in such a way that the at least one guide region has, at least in the region of the bevel surface, a thickness that increases from a load flank of the tooth towards a non-load flank thereof.

16. The rear bicycle derailleur of claim 11, wherein the chain-guiding pulley has an even-numbered of plurality of teeth which are assigned, in alternating fashion in a circumferential direction, to in each case one first or one second tooth group, wherein the teeth of the first tooth group are narrow teeth, which are narrower than a link plate intermediate space of an inner chain link and wherein the second tooth group comprises at least one wide tooth, which is wider than the link plate intermediate space of the inner link plate, such that the at least one wide tooth can protrude fully only into a link plate intermediate space of an outer link plate chain link but not into the link plate intermediate space of the inner link plate chain link.

17. The rear bicycle derailleur of claim 16, wherein at least one tooth of the first tooth group has a reduced tooth height in a radial direction in relation to at least one tooth of the second tooth group.

18. A bicycle drivetrain comprising:
 at least one front sprocket;
 a rear multi-sprocket assembly;
 a chain; and
 a rear derailleur with an upper chain-guiding pulley and a lower chain-tensioning pulley, wherein the upper chain-guiding pulley comprising:
  a bearing region rotatable about an axis of rotation,
  a tooth region with teeth formed thereon for engaging into the chain, and
  a supporting structure that connects the bearing region and the tooth region,
 wherein, on at least one tooth, on each of the inboard and outboard side surfaces thereof, there are formed guide regions for lateral guidance of the chain substantially parallel to the axis of rotation,
  wherein at least one guide region on the inboard surface, compared to at least one guide region on the outboard side surface, of the least one tooth has a reduced thickness in at least some areas relative to a central plane of the chain-guiding pulley such that a chain section running substantially tangentially off the chain-guiding pulley can assume a greater skew angle in an outboard direction than in an inboard direction.

19. The bicycle drivetrain of claim 18, wherein the multi-sprocket assembly has at least one sprocket with an even-numbered of plurality of teeth which are assigned, in alternating fashion in a circumferential direction, to in each case one first or one second tooth group, wherein the teeth of the first tooth group are narrow teeth, which are narrower than a chain inner link plate spacing, and wherein the second tooth group comprises at least one wide tooth, which is wider than a chain inner link plate spacing, such that the at least one wide tooth can protrude fully only into the link plate intermediate space of an outer link plate chain link but not into the link plate intermediate space of an inner link plate chain link.

20. The bicycle drivetrain of claim 18, wherein the rear derailleur is a straight-pin derailleur with a non-inclined or only slightly inclined gearshift parallelogram.

21. The bicycle drivetrain of claim 18, wherein the at least one guide region comprises an elevated thickened portion which is arranged in the region of an inboard side surface or of an outboard side surface of the at least one tooth.

22. The bicycle drivetrain of claim 18, wherein the at least one guide region of the at least one tooth, at least in some areas, has a thickness that decreases with increasing distance to the axis of rotation.

23. The bicycle drivetrain of claim 18, wherein at least one region of decreasing thickness of the at least one guide region of the at least one tooth is configured as a bevel surface which defines a bevel plane which is arranged so as to be tilted by an angle relative to a chain-guiding pulley central plane along an axial direction such that a radially inner delimiting edge of the bevel surface relative to a side surface of the at least one tooth is defined as a result of the tilting.

24. The bicycle drivetrain of claim 23, wherein the at least one bevel plane and thus the at least one bevel surface of the at least one tooth is pivoted by an angle relative to the chain pulley central plane about a chain pulley radial line that is assigned to the at least one tooth in such a way that the radially inner delimiting edge of the bevel surface has a profile that rises in a radially outward direction along an operating direction of rotation of the chain-guiding pulley, and/or in such a way that the at least one guide region has, at least in the region of the bevel surface, a thickness that increases from a load flank of the tooth towards a non-load flank thereof.

* * * * *